US012689789B2

(12) United States Patent
Han et al.

(10) Patent No.: US 12,689,789 B2
(45) Date of Patent: Jul. 21, 2026

(54) IMAGE DISPLAY APPARATUS

(71) Applicant: LG ELECTRONICS INC., Seoul (KR)

(72) Inventors: Sanghyun Han, Seoul (KR); Cheolhwa Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/677,732

(22) Filed: May 29, 2024

(65) Prior Publication Data

US 2025/0071366 A1 Feb. 27, 2025

(30) Foreign Application Priority Data

Aug. 22, 2023 (KR) ........................ 10-2023-0110103

(51) Int. Cl.
H04N 21/43 (2011.01)

(52) U.S. Cl.
CPC .............................. H04N 21/4307 (2013.01)

(58) Field of Classification Search
CPC ......... H04N 21/4307; H04N 21/43635; H04N 21/4302; H04N 21/42607; H04N 21/439; H04R 3/04; H04R 3/12; H04R 2499/15
See application file for complete search history.

(56) References Cited

U.S. PATENT DOCUMENTS

2013/0250174 A1* 9/2013 Ejima .............. H04N 21/43072
348/515
2016/0142849 A1 5/2016 Satheesh et al.

2018/0167149 A1* 6/2018 Stilwell ................... H04W 4/80
2019/0090028 A1* 3/2019 Kirley .............. H04N 21/41265
2021/0076071 A1* 3/2021 Lee ..................... G06F 3/04817
(Continued)

FOREIGN PATENT DOCUMENTS

JP 2007104138 4/2007
KR 1020150081886 7/2015
(Continued)

OTHER PUBLICATIONS

Korean Intellectual Property Office Application No. 10-2023-0110103, Office Action dated Jan. 14, 2025, 6 pages.
(Continued)

*Primary Examiner* — Michael Lee
(74) *Attorney, Agent, or Firm* — LEE, HONG, DEGERMAN, KANG & WAIMEY

(57) ABSTRACT

The image display apparatus of the present disclosure comprises: a display; an audio output device; and a signal processing device, in a simultaneous sound output mode, configured to output a first audio signal based on a first additional delay time to the audio output device and to output a second audio signal based on a second additional delay time, which is lower in level than the first additional delay time, to the sound output device, and in a single sound output mode of the audio output device, configured to output a third audio signal to the audio output device, wherein the first additional delay time is greater than or equal to an additional delay time of a third sound. Accordingly, sound synchronization may be performed in case in which the sound output device and the image display apparatus simultaneously output sound.

18 Claims, 19 Drawing Sheets

(56) References Cited

U.S. PATENT DOCUMENTS

| | | | | |
|---|---|---|---|---|
| 2021/0400168 A1* | 12/2021 | Candelore | ............... | H04L 65/65 |
| 2022/0070583 A1* | 3/2022 | Nejat | ..................... | H04R 5/033 |
| 2023/0126759 A1* | 4/2023 | Lan | ....................... | H04L 47/801 |
| | | | | 370/230 |
| 2023/0277600 A1* | 9/2023 | Goldman | ................ | A61P 25/02 |
| | | | | 424/93.7 |
| 2025/0133183 A1* | 4/2025 | Han | ................... | H04N 21/4112 |

FOREIGN PATENT DOCUMENTS

| | | |
|---|---|---|
| KR | 1020210030469 | 3/2021 |
| KR | 1020210068953 | 6/2021 |

OTHER PUBLICATIONS

Korean Intellectual Property Office Application No. 10-2023-0110103, Office Action dated Sep. 23, 2025, 4 pages.

* cited by examiner

IMAGE DISPLAY APPARATUS

CROSS-REFERENCE TO RELATED APPLICATION(S)

Pursuant to 35 U.S.C. § 119, this application claims the benefit of earlier filing date and right of priority to Korean Application No(s). 10-2023-0110103, filed on Aug. 22, 2023, the contents of which are all incorporated by reference herein in its entirety.

BACKGROUND

1. Field

This disclosure relates to an image display apparatus, and more particularly to an image display apparatus capable of performing sound synchronization in case in which the image display apparatus and a sound output device simultaneously output sound.

2. Description of the Related Art

An image display apparatus is an apparatus capable of displaying various images.

When an image is displayed on the image display apparatus, sound corresponding to the image is output.

With demand from users for a full, rich sound, the output power required for the image display apparatus to output sound increases, and a separate sound output device is increasingly used as well.

However, when the sound output device and the image display apparatus simultaneously output sound, there is a drawback in that a sense of difference is generated between sound output from the sound output device and sound output from the image display apparatus, thereby disrupting immersion when users listen to sound.

SUMMARY

It is an objective of the present disclosure to provide an image display apparatus capable of performing sound synchronization in case in which the image display apparatus and a sound output device simultaneously output sound.

It is another objective of the present disclosure to provide an image display apparatus capable of outputting sound with less delay in case in which the image display apparatus solely outputs sound.

In order to achieve the above and other objectives, an image display apparatus according to an embodiment of the present disclosure includes: a display; an audio output device configured to output sound; an interface configured to exchange data with an external sound output device; and a signal processing device, in a simultaneous sound output mode of the sound output device and the audio output device, configured to output a first audio signal based on a first additional delay time to the audio output device and to output a second audio signal based on a second additional delay time, which is lower in level than the first additional delay time, to the sound output device, and in a single sound output mode of the audio output device, configured to output a third audio signal to the audio output device, wherein the first additional delay time of the first sound based on the first audio signal output from the audio output device, is greater than or equal to an additional delay time of a third sound based on the third audio signal output from the audio output device.

Meanwhile, in the simultaneous sound output mode, the signal processing device may be configured to calculate the first additional delay time of the first audio signal based on audio format information or audio processing time information of the sound output device.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information.

Meanwhile, in the simultaneous sound output mode, the signal processing device may be configured to calculate the first additional delay time of the first audio signal based on video processing time information of an input video signal, and the audio format information or the audio processing time information of the sound output device.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device.

Meanwhile, as a level of the output time information for the sound output device increases, or a level of audio processing time information of an audio driver decreases, or a level of the audio processing time information of the sound output device increases, the signal processing device may be configured to increase the first additional delay time of the first audio signal.

Meanwhile, after the sound output device is turned on, the interface may be configured to receive the audio format information or the audio processing time information of the sound output device through a first transmission line, wherein in the simultaneous sound output mode, the interface may be configured to transmit the second audio signal to the sound output device through a second transmission line.

Meanwhile, in case in which the sound output device is turned off during operation in the simultaneous sound output mode, the signal processing device may be configured to switch to the single sound output mode in which the audio output device solely outputs sound.

Meanwhile, while a broadcast video is displayed on the display, the signal processing device may be configured to control the first additional delay time of the first sound based on the first audio signal output from the audio output device to be greater than or equal to the additional delay time of the third sound based on the third audio signal output from the audio output device.

Meanwhile, the signal processing device may be configured to control the first additional delay time of the first sound based on the first audio signal output from the audio output device while a cinema video is displayed on the display, to be greater than the first additional delay time of the first sound based on the first audio signal which is output from the audio output device while a broadcast video is displayed on the display.

An image display apparatus according to another embodiment of the present disclosure includes: a display; an audio output device configured to output sound; an interface configured to exchange data with an external sound output device; and a signal processing device, in a simultaneous sound output mode of the sound output device and the audio output device, configured to calculate a first additional delay time based on audio format information or audio processing time information of the sound output device, to output a first audio signal based on the calculated first additional delay time to the audio output device, and to output a second audio signal based on a second additional delay time, which is lower in level than the first additional delay, to the sound output device.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information.

Meanwhile, in the simultaneous sound output mode, the signal processing device may be configured to calculate the first additional delay time of the first audio signal based on video processing time information of an input video signal, and the audio format information or the audio processing time information of the sound output device.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device.

Meanwhile, as a level of the output time information for the sound output device increases, or a level of audio processing time information of an audio driver decreases, or a level of the audio processing time information of the sound output device increases, the signal processing device is configured to increase the first additional delay time of the first audio signal.

An image display apparatus according to further another embodiment of the present disclosure includes: a display; an audio output device configured to output sound; an interface configured to exchange data with an external sound output device; and a signal processing device, in a simultaneous sound output mode of the sound output device and the audio output device, configured to output a first audio signal based on a first additional delay time to the audio output device and to output a second audio signal based on a second additional delay time, which is lower in level than the first additional delay time, to the sound output device, wherein the interface is configured to: after the sound output device is turned on, receive audio format information or audio processing time information of the sound output device through a first transmission line; and in the simultaneous sound output mode, transmit the second audio signal to the sound output device through a second transmission line.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information.

Meanwhile, in the simultaneous sound output mode, the signal processing device may be configured to calculate the first additional delay time of the first audio signal based on video processing time information of an input video signal, and the audio format information or the audio processing time information of the sound output device.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device.

Effects of the Disclosure

An image display apparatus according to an embodiment of the present disclosure includes: a display; an audio output device configured to output sound; an interface configured to exchange data with an external sound output device; and a signal processing device, in a simultaneous sound output mode of the sound output device and the audio output device, configured to output a first audio signal based on a first additional delay time to the audio output device and to output a second audio signal based on a second additional delay time, which is lower in level than the first additional delay time, to the sound output device, and in a single sound output mode of the audio output device, configured to output a third audio signal to the audio output device, wherein the first additional delay time of the first sound based on the first audio signal output from the audio output device, is greater than or equal to an additional delay time of a third sound based on the third audio signal output from the audio output device. Accordingly, sound synchronization may be performed in case in which the sound output device and the image display apparatus simultaneously output sound. Particularly, by using different additional delay times, sound synchronization may be performed in case in which the sound output device and the image display apparatus simultaneously output sound. Further, sound with less delay may be output when the image display apparatus solely outputs sound.

Meanwhile, in the simultaneous sound output mode, the signal processing device may be configured to calculate the first additional delay time of the first audio signal based on audio format information or audio processing time information of the sound output device. Accordingly, sound synchronization may be performed in case in which the sound output device and the image display apparatus simultaneously output sound.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information. Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on video processing time information of an input video signal, and the audio format information or the audio processing time information of the sound output device. Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device. Accordingly, sound synchronization may be performed in case in which the sound output device and the image display apparatus simultaneously output sound.

Meanwhile, as a level of the output time information for the sound output device increases, or a level of audio processing time information of an audio driver decreases, or a level of the audio processing time information of the sound output device increases, the signal processing device may be configured to increase the first additional delay time of the first audio signal. Accordingly, sound synchronization may be performed in case in which the sound output device and the image display apparatus simultaneously output sound.

Meanwhile, after the sound output device is turned on, the interface may be configured to receive the audio format information or the audio processing time information of the sound output device through a first transmission line, wherein in the simultaneous sound output mode, the interface may be configured to transmit the second audio signal to the sound output device through a second transmission line. Accordingly, sound synchronization may be performed in case in which the sound output device and the image display apparatus simultaneously output sound.

Meanwhile, in case in which the sound output device is turned off during operation in the simultaneous sound output mode, the signal processing device may be configured to switch to the single sound output mode in which the audio output device solely outputs sound. Accordingly, it is possible to rapidly switch from the simultaneous sound output mode to the single sound output mode.

Meanwhile, while a broadcast video is displayed on the display, the signal processing device may be configured to control the first additional delay time of the first sound based on the first audio signal output from the audio output device to be greater than or equal to the additional delay time of the third sound based on the third audio signal output from the audio output device. Accordingly, sound synchronization may be performed in case in which the sound output device and the image display apparatus simultaneously output sound, and sound suitable for the broadcast video may be output in the single sound output mode.

Meanwhile, the signal processing device may be configured to control the first additional delay time of the first sound based on the first audio signal output from the audio output device while a cinema video is displayed on the display, to be greater than the first additional delay time of the first sound based on the first audio signal which is output from the audio output device while a broadcast video is displayed on the display. Accordingly, sound synchronization may be performed in case in which the sound output device and the image display apparatus simultaneously output sound, and sound suitable for the cinema video may be output in the single sound output mode.

An image display apparatus according to another embodiment of the present disclosure includes: a display; an audio output device configured to output sound; an interface configured to exchange data with an external sound output device; and a signal processing device, in a simultaneous sound output mode of the sound output device and the audio output device, configured to calculate a first additional delay time based on audio format information or audio processing time information of the sound output device, to output a first audio signal based on the calculated first additional delay time to the audio output device, and to output a second audio signal based on a second additional delay time, which is lower in level than the first additional delay, to the sound output device. Accordingly, sound synchronization may be performed in case in which the sound output device and the image display apparatus simultaneously output sound.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information. Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on video processing time information of an input video signal, and the audio format information or the audio processing time information of the sound output device. Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device. Accordingly, sound synchronization may be performed in case in which the sound output device and the image display apparatus simultaneously output sound.

Meanwhile, as a level of the output time information for the sound output device increases, or a level of audio processing time information of an audio driver decreases, or a level of the audio processing time information of the sound output device increases, the signal processing device is configured to increase the first additional delay time of the first audio signal. Accordingly, sound synchronization may be performed in case in which the sound output device and the image display apparatus simultaneously output sound.

An image display apparatus according to further another embodiment of the present disclosure includes: a display; an audio output device configured to output sound; an interface configured to exchange data with an external sound output device; and a signal processing device, in a simultaneous sound output mode of the sound output device and the audio output device, configured to output a first audio signal based on a first additional delay time to the audio output device and to output a second audio signal based on a second additional delay time, which is lower in level than the first additional delay time, to the sound output device, wherein the interface is configured to: after the sound output device is turned on, receive audio format information or audio processing time information of the sound output device through a first transmission line; and in the simultaneous sound output mode, transmit the second audio signal to the sound output device through a second transmission line. Accordingly, sound synchronization may be performed in case in which the sound output device and the image display apparatus simultaneously output sound.

Meanwhile, the interface may be configured to receive the audio format information or the audio processing time information from the sound output device, wherein in the simultaneous sound output mode, the signal processing device may be configured to calculate the first additional delay time of the first audio signal based on the audio format information or the audio processing time information.

Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on video processing time information of an input video signal, and the audio format information or the audio processing time information of the sound output device. Accordingly, sound synchronization may be performed in case in which the sound output device and the image display apparatus simultaneously output sound.

Meanwhile, in the simultaneous sound output mode, the signal processing device may be configured to calculate the first additional delay time of the first audio signal based on the video processing time information of the input video signal, output time information for the sound output device, and the audio format information or the audio processing time information of the sound output device. Accordingly, sound synchronization may be performed in case in which the sound output device and the image display apparatus simultaneously output sound.

DETAILED DESCRIPTION OF THE PREFERRED EMBODIMENTS

Hereinafter, the present disclosure will be described in further detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
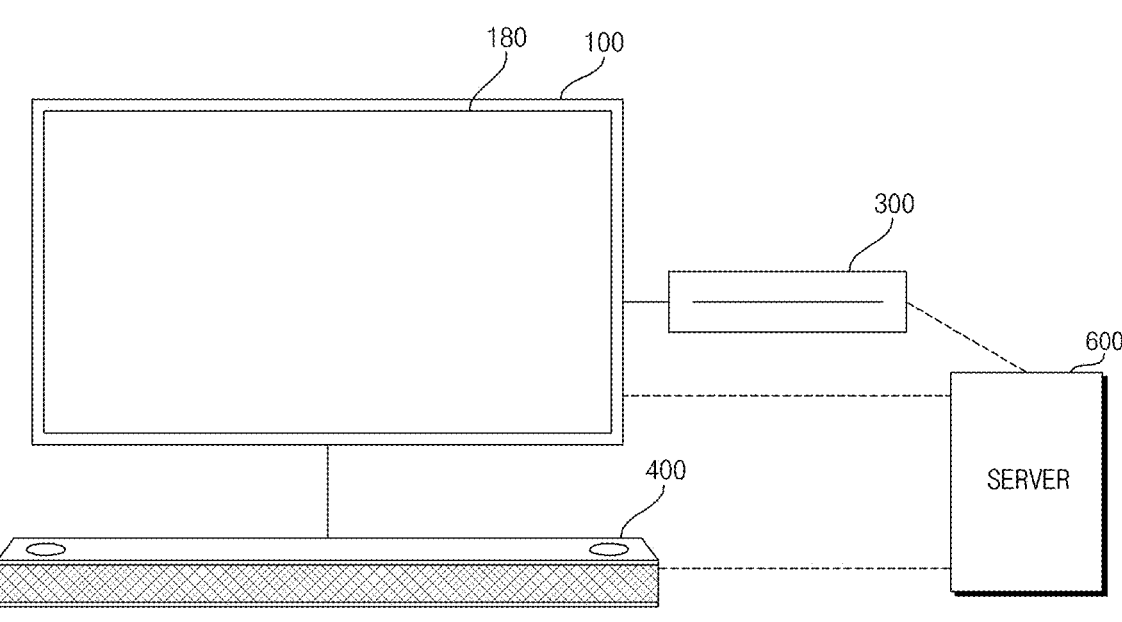
FIG. 1 is a diagram illustrating an image display system according to an embodiment of the present disclosure.

FIG. 1 is a diagram illustrating an image display system according to an embodiment of the present disclosure.

Referring to the drawing, the image display system 10 according to an embodiment of the present disclosure may include an image display apparatus 100 including a display 180, and a sound output device 400.

The image display system 10 may include a set-top box 300, the sound output device 400, and a server 600.

The image display apparatus 100 according to an embodiment of the present disclosure may receive images from the set-top box 300 or the server 600.

For example, the image display apparatus 100 may receive an image signal from the set-top box 300 through an HDMI terminal.

Figure 2:
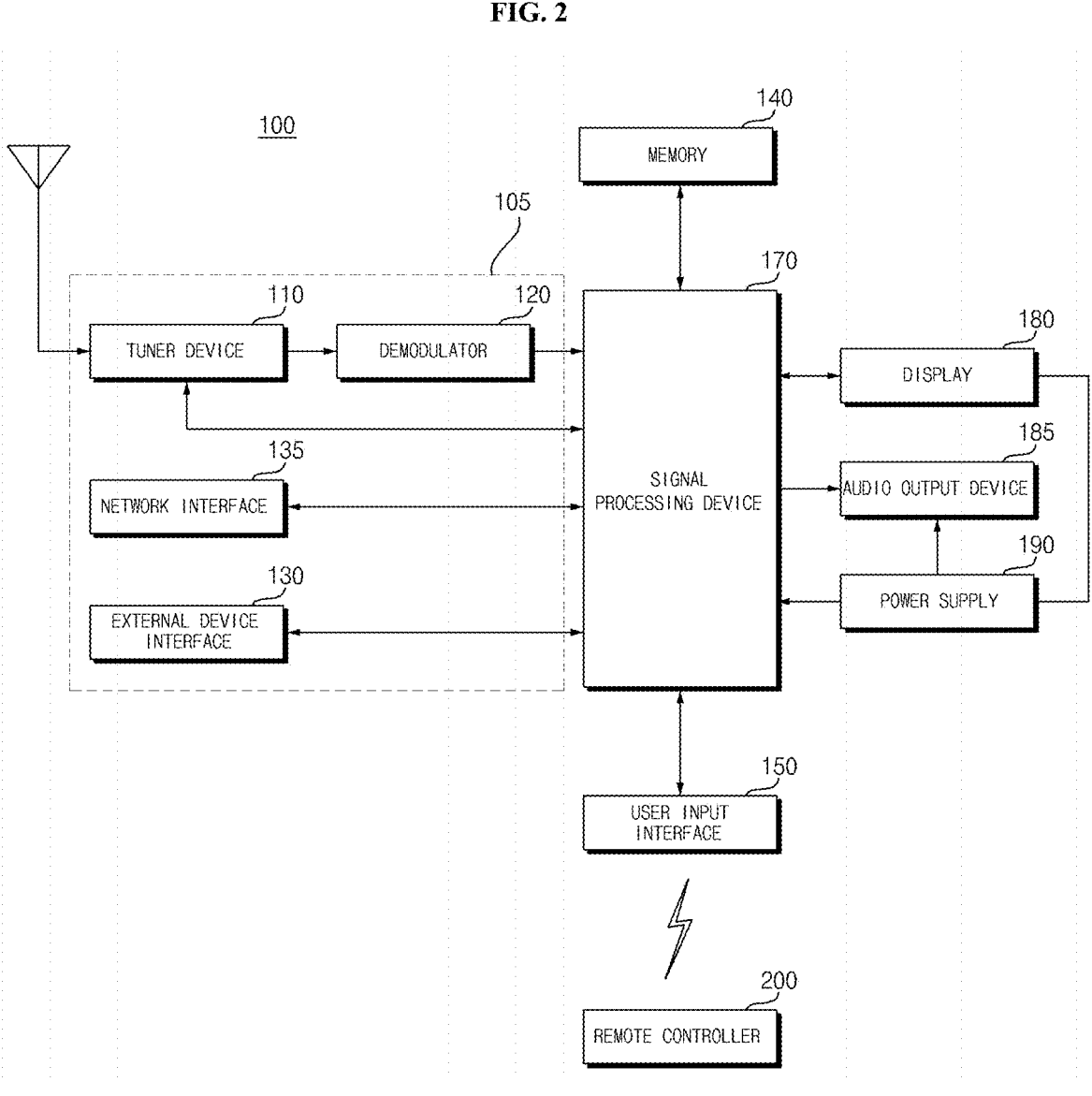
FIG. 2 is an example of an internal block diagram of an image display apparatus of FIG. 1.

In another example, the image display apparatus 100 may receive an image signal from the server 600 through a network terminal or a network interface 135 (see FIG. 2).

In yet another example, the image display apparatus 100 may receive a broadcast signal through an internal tuner device 110 (see FIG. 2).

Meanwhile, the image display apparatus 100 according to an embodiment of the present disclosure may include a display 180, an audio output device 185 (see FIG. 2) configured to output sound, an interface 130a (see FIG. 6) configured to exchange data with an external sound output device 400, and a signal processing device 170 (see FIG. 2) which, in a simultaneous sound output mode in which the sound output device 400 and the audio output device 185 simultaneously output sound, is configured to output a first audio signal based on a first additional delay time to the audio output device 185 and to output a second audio signal based on a second additional delay time to the sound output device 400. Accordingly, sound synchronization may be performed in case in which the sound output device 400 and the image display apparatus simultaneously output sound. Particularly, by using different additional delay times, sound synchronization may be performed in case in which the sound output device 400 and the image display apparatus simultaneously output sound.

Meanwhile, in a single sound output mode in which the audio output device 185 solely outputs sound, the signal processing device 170 in the image display apparatus 100 according to an embodiment of the present disclosure may perform control to output a third audio signal to the audio output device 185. Accordingly, sound with less delay may be output when the image display apparatus 100 solely outputs sound.

Meanwhile, the display 180 may be implemented with any one of various panels. For example, the display 180 may be any one of a liquid crystal display (LCD) panel, an organic light emitting diode (OLED) panel, an inorganic light emitting diode (LED) panel, and the like.

Meanwhile, the image display apparatus 100 shown in FIG. 1 may be a TV, a monitor, a tablet PC, a mobile device, etc.

FIG. 2 is a block diagram of the image display apparatus shown in FIG. 1.

Referring to FIG. 2, the image display apparatus 100 according to an embodiment of the present disclosure may include an image receiver 105, an external device interface 130, a memory 140, a user input interface 150, a sensor device 1220 (see FIG. 12), a signal processing device 170, a display 180, and an audio output device 185.

The image receiver 105 may comprise a tuner device 110, a demodulator 120, a network interface 135, and an external device interface 130.

Unlike FIG. 2, the image receiver 105 may comprise only the tuner device 110, the demodulator 120, and the external device interface 130. That is, the image receiver 105 may not include the network interface 135.

The tuner device 110 selects a Radio Frequency (RF) broadcast signal corresponding to a channel selected by a user or an RF broadcast signal corresponding to each of pre-stored channels from among a plurality of RF broadcast signals received through an antenna (not shown). In addition, the tuner device 110 downconverts the selected RF broadcast signal into an Intermediate Frequency (IF) signal or a baseband Audio/Video (A/V) signal.

For example, if the selected RF broadcast signal is a digital broadcast signal, the tuner device 110 downconverts the selected RF broadcast signal into a digital IF signal. On the other hand, if the selected RF broadcast signal is an analog broadcast signal, the tuner device 110 downconverts the selected RF broadcast signal into an analog baseband A/V signal (CVBS/SIF). That is, the tuner device 110 may process a digital broadcast signal or an analog broadcast signal. The analog baseband A/V signal, CVBS/SIF from the tuner device 110 may be provided directly to the signal processing device 170.

Meanwhile, the tuner device 110 may comprise a plurality of tuners for receiving broadcast signals of a plurality of channels, or a single tuner for simultaneously receiving broadcast signals of a plurality of channels.

The demodulator 120 receives the digital IF signal from the tuner device 110 and demodulates the digital IF signal.

The demodulator 120 may perform demodulation and channel decoding on the digital IF signal, thereby obtaining a stream signal TS. The stream signal TS may be a signal in which an image signal, an audio signal and/or a data signal are multiplexed.

The stream signal output from the demodulator 120 may be input to the signal processing device 170 and then subjected to demultiplexing and A/V signal processing. The signal processing device 170 outputs the processed video and audio signals to the display 180 and the audio output device 185, respectively.

The external device interface 130 may transmit and receive data to and from a connected external device (not shown) such as a set-top box. For this purpose, the external device interface 130 may comprise an A/V Input/Output (I/O) device (not shown).

The external device interface 130 may be connected to an external device, wirelessly or by wire, such as a Digital Versatile Disk (DVD) player, a Blu-ray Disk (BD) player, a game console, a camera, a camcorder, a computer (e.g. a laptop computer), or a set-top box. Then, the external device interface 130 may transmit and receive signals to and from the external device.

The A/V input and output device may receive audio and image signals from an external device, and a wireless communicator (not shown) may conduct short-range wireless communication with another electronic device.

The external device interface 130 may exchange data with a nearby mobile terminal 600 through the wireless communicator (not shown). Particularly, the external device interface 130 may receive device information, executed application information, an application image, and so on from the mobile terminal 600 in a mirroring mode.

The network interface 135 serves as an interface between the image display apparatus 100 and a wired/wireless network such as the Internet. For example, the network interface 135 may receive content or data from the Internet or from a Content Provider (CP) or a Network Provider (NP) over a network.

Meanwhile, the network interface 135 may comprise a wireless communicator (not shown).

The memory 140 may store programs necessary for the signal processing device 170 to process signals and control, and may also store a signal-processed image, audio, or data signal.

In addition, the memory 140 may also temporarily store an audio, video or data signal received from the external device interface 130. The memory 140 may store information about broadcast channels by the channel-add function.

While the memory 140 is shown in FIG. 2 as configured separately from the signal processing device 170, to which the present disclosure is not limited, the memory 140 may be incorporated into the signal processing device 170.

The user input interface 150 transmits a signal received from the user to the signal processing device 170 or transmits a signal received from the signal processing device 170 to the user.

For example, the user input interface 150 may transmit/receive user input signals, such as a power-on/off signal, a channel selection signal, a screen setting signal, etc., to/from a remote controller 200, may provide the signal processing device 170 with user input signals received from local keys (not shown), such as inputs of a power key, a channel key, a volume key, a setting value, etc., may transmit a user input signal, received from the sensor device 1220 (see FIG. 12) that senses a user gesture, to the signal processing device 170, or may transmit a signal received from the signal processing device 170 to the sensor device 1220 (see FIG. 12).

The signal processing device 170 may demultiplex a stream signal received from the tuner device 110, the demodulator 120, the network interface 135, or the external device interface 130 into a number of signals, and process the demultiplexed signals into audio and image signals.

For example, the signal processing device 170 may receive a broadcast signal or an HDMI signal received by the image receiver 105, and output a processed image signal by processing the received broadcast signal or the received HDMI signal.

The image signal processed by the signal processing device 170 may be displayed as an image corresponding to the image signal on the display 180. The image signal processed by the signal processing device 170 may also be transmitted to an external output device through the external device interface 130.

The audio signal processed by the signal processing device 170 may be output to the audio output device 185. Also, the audio signal processed by the signal processing device 170 may be transmitted to an external output device through the external device interface 130.

While not shown in FIG. 2, the signal processing device 170 may comprise a Demultiplexer (DEMUX) and a video processor, which will be described later with reference to FIG. 3. That is, the signal processing device 170 may process various types of signals and accordingly may be implemented in the form of a system On Chip (SOC). It will be described in more detail with reference to FIG. 3.

In addition, the signal processing device 170 may provide overall control to the image display apparatus 100. For example, the signal processing device 170 may control the tuner device 110 to select an RF broadcast signal corresponding to a user-selected channel or a pre-stored channel.

The signal processing device 170 may control the image display apparatus 100 according to a user command received through the user input interface 150 or according to an internal program.

The signal processing device 170 may control the display 180 to display an image. The image displayed on the display 180 may be a Two-Dimensional (2D) or Three-Dimensional (3D) still image or video.

The signal processing device 170 may control a particular 2D object in the image displayed on the display 180. For example, the particular 2D object may be at least one of a linked Web page (e.g., from a newspaper or a magazine), an Electronic Program Guide (EPG), a menu, a widget, an icon, a still image, a video, or text.

The signal processing device 170 may locate the user based on an image captured by a camera device (not shown). For example, the signal processing device 170 may determine the distance (a z-axis coordinate) between the user and the image display apparatus 100. In addition, the signal processing device 170 may determine x-axis and y-axis coordinates corresponding to the position of the user on the display 180.

The display 180 generates drive signals by converting a processed image signal, a processed data signal, an On Screen Display (OSD) signal, and a control signal received from the signal processing device 170 or an image signal, a data signal, and a control signal received from the external device interface 130.

Meanwhile, the display 180 may also be a touch screen that can be used not only as an output device but also as an input device.

The audio output device 185 may receive a processed audio signal from the signal processing device 170 and output the received audio signal as voice.

The camera device (not shown) captures a user. The camera device may comprise, but not limited to, a single camera. When needed, the camera device may comprise a plurality of cameras. Image information captured by the camera device may be provided to the signal processing device 170.

The signal processing device 170 may sense a user's gesture from a captured image received from the camera device (not shown) or from signals received from the sensor device 1220 (see FIG. 12) alone or in combination.

A power supply 190 supplies power across the whole image display apparatus 100. Particularly, the power supply 190 may supply power to the signal processing device 170 which may be implemented as a System On Chip (SOC), the display 180 for displaying an image, the audio output device 185 for outputting an audio signal, and so on.

Specifically, the power supply 190 may comprise a converter for converting Alternating Current (AC) power to Direct Current (DC) power, and a DC/DC converter for converting the level of DC power.

The remote controller 200 transmits a user input to the user input interface 150. For the transmission of a user input, the remote controller 200 may operate based on various communication standards such as Bluetooth, RF communication, IR communication, Ultra WideBand (UWB), and ZigBee. In addition, the remote controller 200 may receive an image signal, an audio signal and/or a data signal from the user input interface 150 and may output the received signal as an image or sound.

The above-described image display apparatus 100 may be a fixed or mobile digital broadcast receiver.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
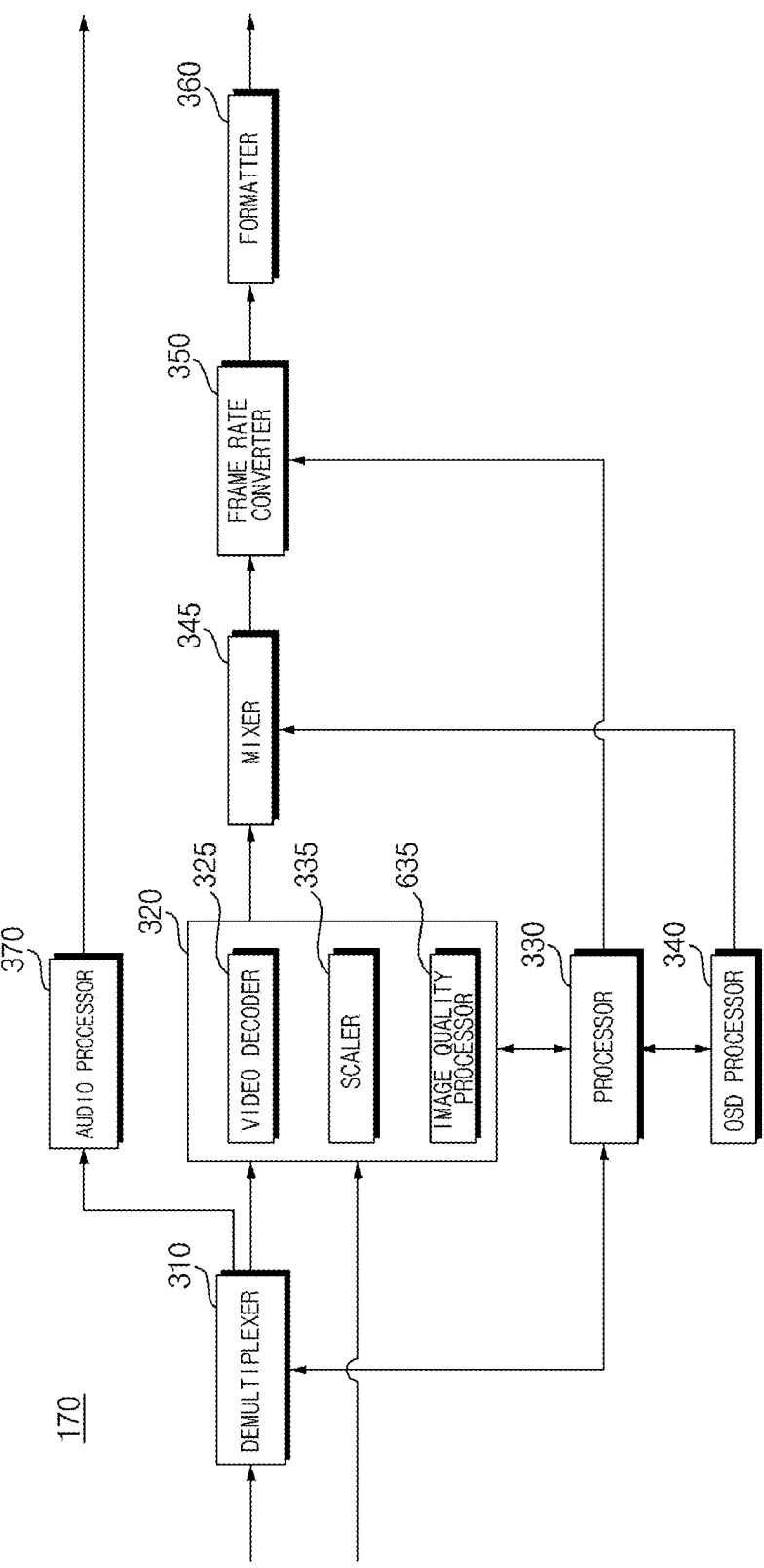
FIG. 3 is an example of an internal block diagram of a signal processing device of FIG. 2.

FIG. 3 is a block diagram of the signal processing device illustrated in FIG. 2.

Referring to FIG. 3, the signal processing device 170 may comprise a DEMUX 310, an image processor 320, a processor 330, and an audio processor 370. The signal processing device 170 may further comprise a data processor (not shown).

The DEMUX 310 demultiplexes an input stream. For example, the DEMUX 310 may demultiplex an MPEG-2 TS into an image signal, an audio signal, and a data signal. The input stream signal may be received from the tuner device 110, the demodulator 120, or the external device interface 130.

The image processor 320 may perform signal processing based on a received image. For example, the image processor 320 may perform image processing based on an image signal demultiplexed by the DEMUX 310.

To this end, the image processor 320 may comprise a video decoder 325, a scaler 335, an image quality processor 635, a video encoder (not shown), an OSD processor 340, a Fame Rate Converter (FRC) 350, a formatter 360, etc.

The video decoder 325 decodes the demultiplexed image signal, and the scaler 335 scales resolution of the decoded image signal so that the image signal may be displayed on the display 180.

The video decoder 325 may be provided with decoders that operate in conformance to various standards. For example, the video decoder 325 may comprise, for example, an MPEG-2 decoder, an H.264 decoder, a 3D video decoder for a color image, a depth image, a decoder for multi-view images, and so on.

The scaler 335 may scale a received image signal which is decoded by the video decoder 325.

For example, when the size or resolution of a received image signal is small and low, the scaler 335 may upscale the received image signal. When the size or resolution of a received image signal is great and high, the scaler 335 may downscale the received image signal.

The image quality processor 635 may perform image quality processing based on a received image signal which is decoded by the video decoder 325.

For example, the image quality processor 635 may reduce noise of a received image signal, extend resolution of grayscale of the received image signal, enhance image resolution, perform High Dynamic Range (HDR)-based signal processing, change a frame rate, or perform image quality processing to corresponding to characteristics of a panel.

The OSD processor 340 generates an OSD signal autonomously or according to a user input. For example, the OSD processor 340 may generate signals by which a variety of information is displayed as graphics or text on the display 180, according to user input signals. The OSD signal may comprise various data such as a User Interface (UI), a variety of menus, widgets, and icons. The generated OSD signal may comprise a 2D or 3D object.

Further, the OSD processor 340 may generate a pointer to be displayed on the display 180 based on a pointing signal received from the remote controller 200. Especially, the pointer may be generated from a pointing signal processing device (not shown), which may reside in the OSD processor 340. Obviously, the pointing signal processing device may be configured separately from the OSD processor 240.

The FRC 350 may change the frame rate of the received image signal or simply output the image signal without frame rate conversion.

The formatter 360 may change the format of a received image signal to an image signal to be displayed on the display.

Particularly, the formatter 360 may change the format of a received image signal to correspond to characteristics of a display panel.

Meanwhile, the formatter 360 may change the format of an image signal. For example, the formatter 360 may change the format of a 3D image signal to one of various 3D formats such as a side by side format, a top/down format, a frame sequential format, an interlaced format, and a checker format.

The processor 330 may control overall operations in the image display apparatus 100 or the signal processing device 170.

For example, the processor 330 may control the tuner device 110 to tune to an RF broadcast signal corresponding to a user-selected channel or a pre-stored channel.

The processor 330 may control the image display apparatus 100 according to a user command received through the user input interface 150 or according to an internal program.

In addition, the processor 330 may control data transmission through the network interface 135 or the external device interface 130.

In addition, the processor 330 may control operations of the DEMUX 310 and the image processor 320 in the signal processing device 170.

The audio processor 370 of the signal processing device 170 may process the demultiplexed audio signal. For the audio signal processing, the audio processor 370 may have a plurality of decoders.

The audio processor 370 of the signal processing device 170 may also adjust the bass, treble, and volume of the audio signal.

The data processor (not shown) of the signal processing device 170 may process the data signal obtained by demultiplexing the input stream signal. For example, if the demultiplexed data signal is a coded data signal, the data processor may decode the coded data signal. The coded data signal may be an EPG which includes broadcasting information specifying the start time, end time, and the like of a scheduled broadcast program of each channel.

Meanwhile, the block diagram of the signal processing device 170 illustrated in FIG. 3 is purely exemplary. Depending upon the specifications of the signal processing device 170 in actual implementation, the components of the signal processing device 170 may be combined or omitted or new components may be added.

In particular, the FRC 350 and the formatter 360 may be provided separately from the image processor 320.

Figure 4A:
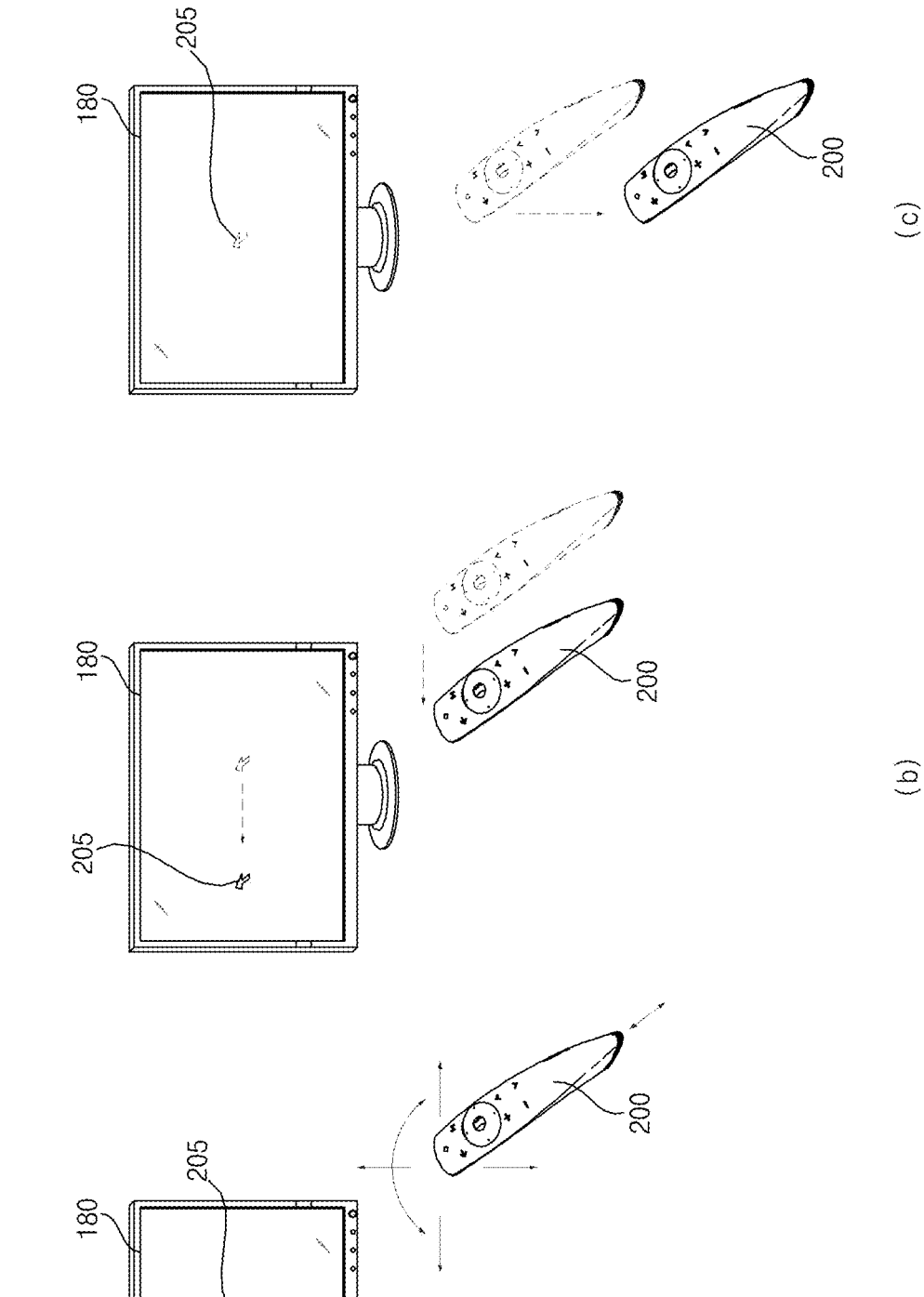
FIG. 4A is a diagram illustrating a method for controlling a remote controller illustrated in FIG. 2.

FIG. 4A is a diagram illustrating a method for controlling the remote controller illustrated in FIG. 2.

(a) of FIG. 4A illustrates a pointer 205 representing movement of the remote controller 200, displayed on the display 180.

The user may move or rotate the remote controller 200 up and down, side to side ((b) of FIG. 4A), and back and forth ((c) of FIG. 4A). The pointer 205 displayed on the display 180 corresponds to movement of the remote controller 200. Since the pointer 205 moves in accordance with the movement of the remote controller 200 in a 3D space, the remote controller 200 may be referred to as a remote controller 200 or a 3D pointing device.

Referring to (b) of FIG. 4A, if the user moves the remote controller 200 to the left, the pointer 205 moves to the left on the display 180.

A sensor of the remote controller 200 detects the movement of the remote controller 200 and transmits motion information corresponding to the result of the detection to the image display apparatus. Then, the image display apparatus may calculate coordinates of the pointer 205 based on the motion information of the remote controller 200. The image display apparatus then displays the pointer 205 at the calculated coordinates.

Referring to (c) of FIG. 4A, while pressing a predetermined button of the remote controller 200, the user moves the remote controller 200 away from the display 180. Then, a selected area corresponding to the pointer 205 may be zoomed in and enlarged on the display 180. On the contrary, if the user moves the remote controller 200 toward the display 180, the selection area corresponding to the pointer 205 is zoomed out and thus contracted on the display 180. On the other hand, when the remote controller 200 moves away from the display 180, the selection area may be zoomed out and when the remote controller 200 approaches the display 180, the selection area may be zoomed in.

With the predetermined button pressed in the remote controller 200, the up, down, left and right movements of the remote controller 200 may be ignored. That is, when the remote controller 200 moves away from or approaches the display 180, only the back and forth movements of the remote controller 200 are sensed, while the up, down, left and right movements of the remote controller 200 are ignored. Unless the predetermined button is pressed in the remote controller 200, the pointer 205 moves in accordance with the up, down, left or right movement of the remote controller 200.

The speed and direction of the pointer 205 may correspond to the speed and direction of the remote controller 200.

Figure 4B:
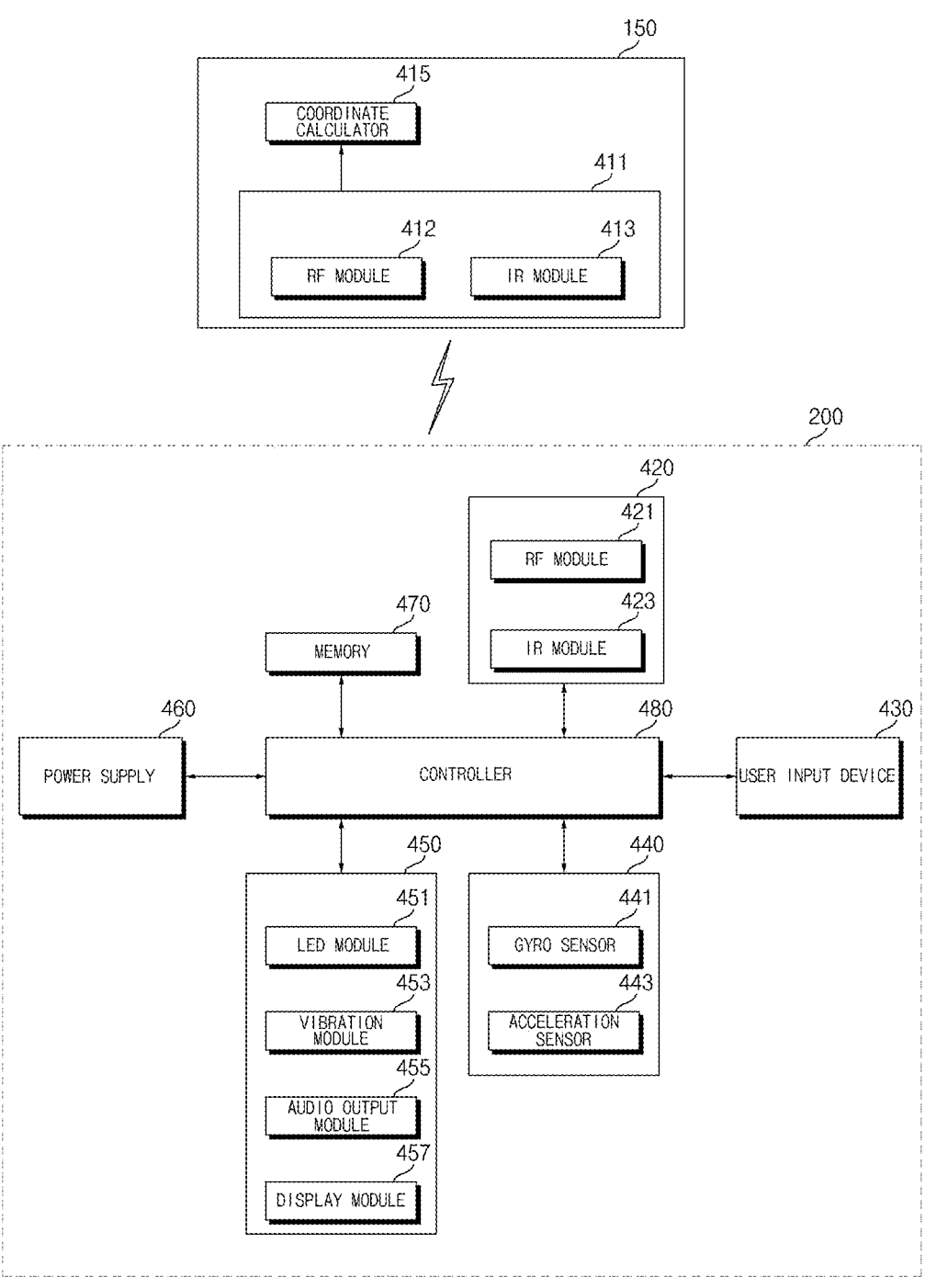
FIG. 4B is an internal block diagram of the remote controller illustrated in FIG. 2.

FIG. 4B is a block diagram of the remote controller illustrated in FIG. 2.

Referring to FIG. 4B, the remote controller 200 may comprise a wireless communicator 425, a user input device 435, a sensor device 440, an output device 450, a power supply 460, a memory 470, and a controller 480.

The wireless communicator 425 transmits signals to and/or receives signals from one of image display apparatuses according to embodiments of the present disclosure. One of the image display apparatuses according to embodiments of the present disclosure, that is, the image display apparatus 100 will be taken as an example.

In this embodiment, the remote controller 200 may comprise an RF module 421 for transmitting RF signals to and/or receiving RF signals from the image display apparatus 100 according to an RF communication standard. Further, the remote controller 200 may comprise an IR module 423 for transmitting IR signals to and/or receiving IR signals from the image display apparatus 100 according to an IR communication standard.

In this embodiment, the remote controller 200 may transmit a signal carrying information about movement of the remote controller 200 to the image display apparatus 100 through the RF module 421.

Further, the remote controller 200 may receive signals from the image display apparatus 100 through the RF module 421. The remote controller 200 may transmit commands, such as a power on/off command, a channel switching command, or a sound volume change command, to the image display apparatus 100 through the IR module 423, as needed.

The user input device 435 may comprise a keypad, a plurality of buttons, a touch pad, or a touch screen. The user may enter commands to the image display apparatus 100 by manipulating the user input device 435. If the user input device 435 includes a plurality of hard-key buttons, the user may input various commands to the image display apparatus 100 by pressing the hard-key buttons. If the user input device 435 includes a touch screen displaying a plurality of soft keys, the user may input various commands to the image display apparatus 100 by touching the soft keys. The user input device 435 may also include various input tools other than those set forth herein, such as a scroll key and/or a jog key, which should not be construed as limiting the present disclosure.

The sensor device 440 may comprise a gyro sensor 441 and/or an acceleration sensor 443. The gyro sensor 441 may sense the movement of the remote controller 200.

For example, the gyro sensor 441 may sense motion information about the remote controller 200 in X-, Y-, and Z-axis directions. The acceleration sensor 443 may sense the moving speed of the remote controller 200. The sensor device 440 may further comprise a distance sensor for sensing the distance between the remote controller 200 and the display 180.

The output device 450 may output a video and/or audio signal corresponding to a manipulation of the user input device 435 or a signal transmitted by the image display apparatus 100. The user may easily identify whether the user input device 435 has been manipulated or whether the image display apparatus 100 has been controlled based on the video and/or audio signal output from the output device 450.

For example, the output device 450 may comprise an LED module 451 which is turned on or off whenever the user input device 435 is manipulated or whenever a signal is received from or transmitted to the image display apparatus 100 through the wireless communicator 425, a vibration module 453 which generates vibrations, an audio output module 455 which outputs audio data, or a display module 457 which outputs an image.

The power supply 460 supplies power to the remote controller 200. If the remote controller 200 is kept stationary for a predetermined time or longer, the power supply 460 may, for example, cut off supply of power to the remote controller 200 in order to save power. The power supply 460 may resume supply of power if a specific key on the remote controller 200 is manipulated.

The memory 470 may store various programs and application data for controlling or operating the remote controller 200. The remote controller 200 may wirelessly transmit signals to and/or receive signals from the image display apparatus 100 in a predetermined frequency band through the RF module 421. The controller 480 of the remote controller 200 may store information regarding the frequency band used for the remote controller 200 to wirelessly transmit signals to and/or wirelessly receive signals from the paired image display apparatus 100 in the memory 470 and may then refer to this information for use at a later time.

The controller 480 provides overall control to the remote controller 200. For example, the controller 480 may transmit a signal corresponding to a key manipulation detected from the user input device 435 or a signal corresponding to motion of the remote controller 200, as sensed by the sensor device 440, to the image display apparatus 100 through the wireless communicator 425.

The user input interface 150 of the image display apparatus 100 may comprise a wireless communication module 411 which wirelessly transmits signals to and/or wirelessly receives signals from the remote controller 200, and a coordinate calculator 415 which calculates coordinates representing the position of the remote controller 200 on the display screen, which is to be moved in accordance with the movement of the remote controller 200.

The user input interface 150 may wirelessly transmit RF signals to and/or wirelessly receive RF signals from the remote controller 200 through an RF module 412. In addition, the user input interface 150 may wirelessly receive IR signals from the remote controller 200 through an IR module 413 according to the IR communication standard.

The coordinate calculator 415 may receive motion information regarding the movement of the remote controller 200 through the wireless communication module 411 and may calculate coordinates (x, y) representing the position of the pointer 205 on a screen of the display 180 by correcting the motion information for possible errors or user hand tremor.

A signal received in the image display apparatus 100 from the remote controller 200 through the user input interface 150 may be transmitted to the signal processing device 170. Then, the signal processing device 170 may acquire information regarding the movement of the remote controller 200 and information regarding a key manipulation detected from the remote controller 200 from the signal received from the remote controller 200, and may control the image display apparatus 100 based on the acquired information.

In another example, the remote controller 200 may calculate the coordinates of a position to which the pointer is to be shifted in correspondence with its movement and output the coordinates to the user input interface 150 of the image display apparatus 100. In this case, the user input interface 150 may transmit information about the pointer coordinates which was not corrected for possible errors or user hand tremor to the signal processing device 170.

In a further example, unlike the configuration of the remote controller 200 illustrated in FIG. 17B, the coordinate calculator 415 may reside in the signal processing device 170, instead of the user input interface 150.

Figure 5:
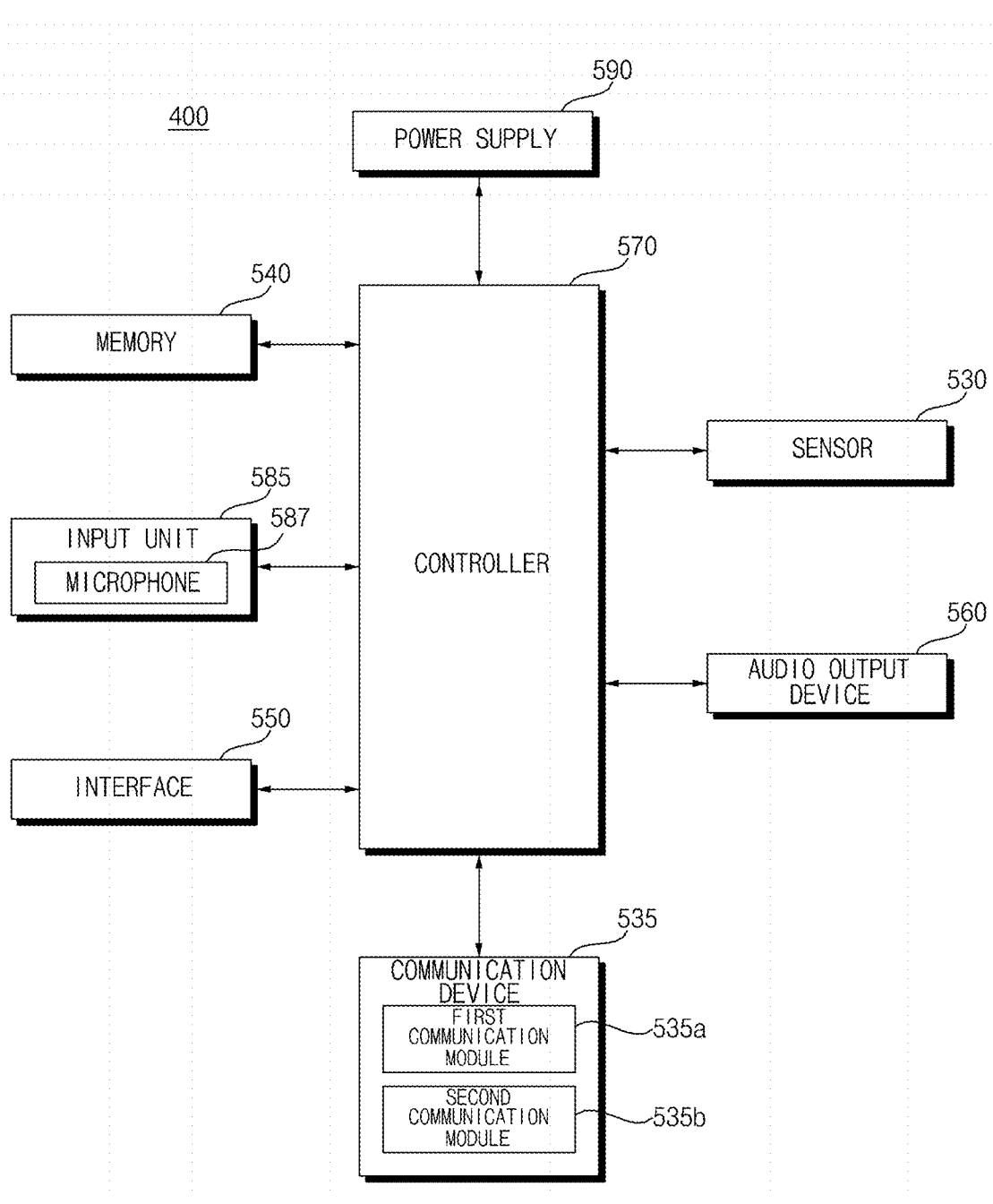
FIG. 5 is an internal block diagram of a sound output device of FIG. 1.

FIG. 5 is an internal block diagram illustrating a sound output device of FIG. 1.

Referring to the drawing, the sound output device 400 may include a sensor 530, a communication device 535, a memory 540, an interface 550, an audio output device 560, a controller 570, an input unit 585, and a power supply 590. When implemented in actual applications, two or more of these components may be combined into a single component as needed, or a single component may be divided into two or more components.

The sensor 530 may include an inertial sensor (not shown). The inertial sensor may include an acceleration sensor, a gyro sensor, a gravity sensor, and the like. For example, the acceleration sensor, gyro sensor, gravity sensor, and the like may include a 6-axis sensor.

The sensor 530 may output motion information of the sound output device 400, e.g., motion information (acceleration information, angular velocity information) on x, y, and z axes, or location information, and the like.

Meanwhile, the sensor 530 may sense temperature information or current information or voltage information of the sound output device.

Meanwhile, the communication device 535 may provide an interface for communication with an external device. To this end, the communication device 535 may include a first communication module 353a and a second communication module 353b.

For example, the first communication module 353a in the communication deice 535 may be a wireless communication module and may provide an interface for wireless data communication such as Bluetooth.

For example, the second communication module 353b in the communication device 535 may be a wireless communication module and may provide an interface for wireless data communication such as Wi-Fi, UWB, and the like.

The memory 540 may store programs for processing or controlling by the controller 570 in the sound output device 400 and may also temporarily store input/output data.

For example, the memory 540 may store audio format information or audio processing time information of the sound output device 400.

The interface 550 may provide an interface for wired data communication such as HDMI.

For example, the interface 550 may transmit the audio format information or the audio processing time information of the sound output device 400 to the image display apparatus 100.

The audio output device 560 may output sound based on an audio signal processed by the controller 570 of the sound output device 400.

The controller 570 may control the overall operation of the sound output device 400 by controlling the operation of each unit of the sound output device 400.

Meanwhile, the controller 570 may perform signal processing on the audio signal received from an external source.

Meanwhile, the controller 570 may reproduce the audio signal received from the first communication module 535a or the second communication module 535b.

Meanwhile, the input unit 585 may include a button for initializing the sound output device 400 or an operation input button, and the like.

Meanwhile, the input unit 585 may include a microphone 587 for sound collection.

Meanwhile, the input unit 585 may include a camera (not shown) for capturing images.

The power supply 590 may supply power required for operation of each component under the control of the controller 570.

Particularly, the power supply 590 may include a battery (not shown) that stores and outputs direct current power.

Figure 6:
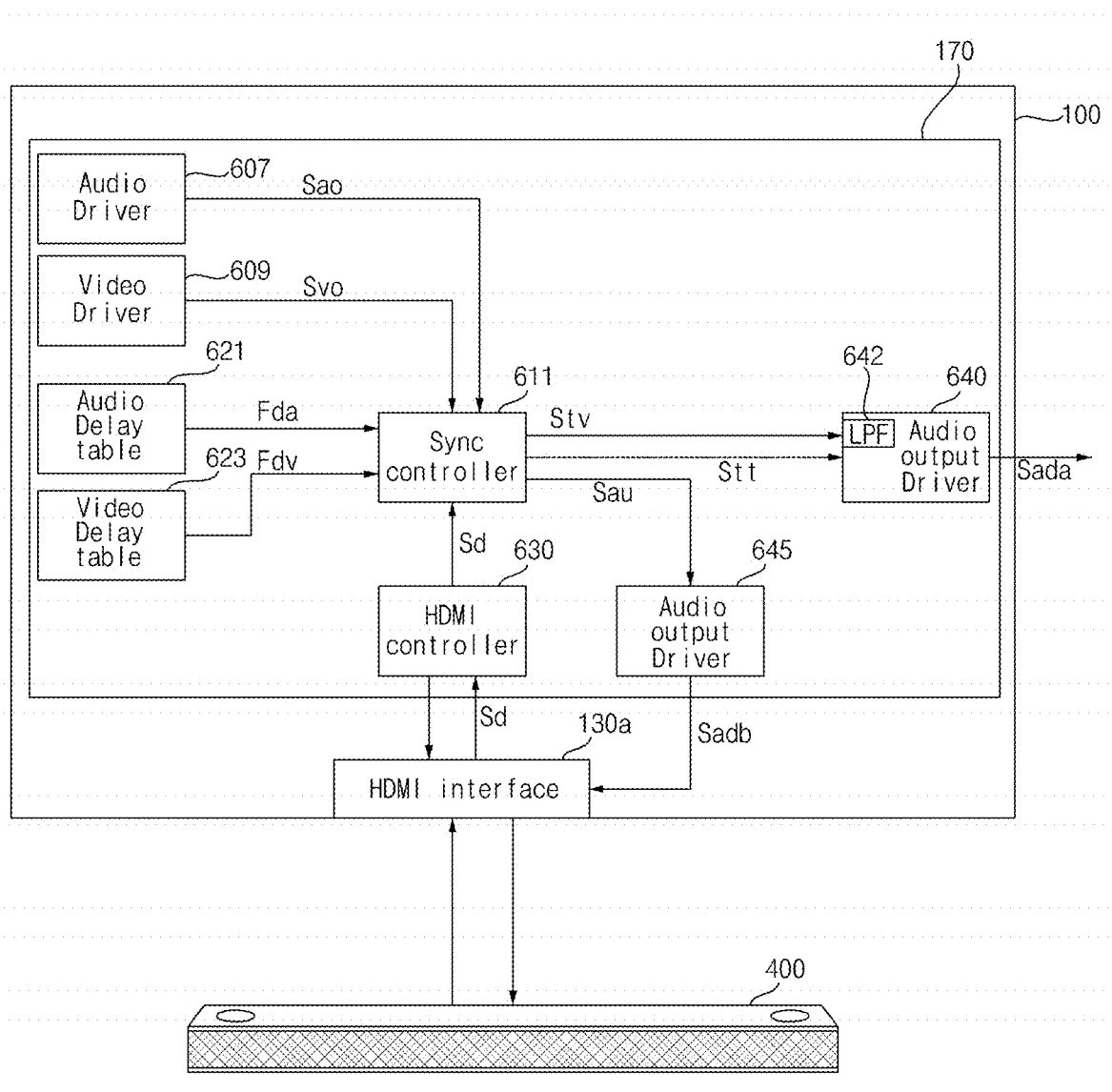
FIG. 6 is an example of an internal block diagram illustrating an image display apparatus according to an embodiment of the present disclosure.

FIG. 6 is an internal block diagram illustrating an image display apparatus according to an embodiment of the present disclosure.

Referring to the drawing, an image display apparatus 100 according to an embodiment of the present disclosure includes a display 180, an audio output device 185 configured to output sound, an interface 130a configured to exchange data with an external sound output device 400, and a signal processing device 170.

The interface 130a may be an HDMI interface.

Meanwhile, the interface 130a may receive audio format information from the sound output device 400 or audio processing time information Sd corresponding to the audio format information of the sound output device 400.

In a simultaneous sound output mode in which the sound output device 400 and the audio output device 185 simultaneously output sound, the signal processing device 170 may perform control to output a first audio signal Stv based on a first additional delay time to the audio output device

185 and to output a second audio signal Sau based on a second additional delay time to the sound output device 400. Accordingly, sound synchronization may be performed in case in which the sound output device 400 and the image display apparatus simultaneously output sound. Particularly, by using different additional delay times, sound synchronization may be performed in case in which the sound output device 400 and the image display apparatus simultaneously output sound.

Meanwhile, in a single sound output mode in which the audio output device 185 solely outputs sound, the signal processing device 170 may perform control to output a third audio signal Stt to the audio output device 185.

For example, in the single sound output mode in which the audio output device 185 solely outputs sound, if a level of video processing time information of an input image signal is greater than a level of audio processing time information of the audio output device 185, the signal processing device 170 may perform control to output the third audio signal Stt based on a third additional delay time, which corresponds to a difference between the levels, to the audio output device 185. In this case, the third additional delay time is less than the first additional delay time or the second additional delay time. Accordingly, when the image display apparatus 100 solely outputs sound, sound with less delay may be output.

In another example, in the single sound output mode in which the audio output device 185 solely outputs sound, if a level of video processing time information of an input image signal is lower than a level of audio processing time information of the audio output device 185, the signal processing device 170 may perform control so that a third additional delay time, corresponding to a difference between the levels, is added to an image signal instead of the third audio signal Stt. Accordingly, the additional delay time of the third audio signal Stt may be at level 0, and thus sound with less delay may be output when the image display apparatus 100 solely outputs sound, compared to the case of simultaneous sound output.

Meanwhile, the signal processing device 170 may include an interface controller 630 configured to control the interface 130a, and a delay controller 611 configured to calculate a delay time of an audio signal based on the audio format information received from the interface 130a or the interface controller 630 or the audio processing time information Sd of the sound output device 400.

Meanwhile, in the simultaneous sound output mode, the delay controller 611 in the signal processing device 170 may output the first audio signal, which is based on the calculated first additional delay time, to a first audio output driver 640, and may output a second audio signal, which is based on the calculated second additional delay time, to a second audio output driver 645.

Meanwhile, in the simultaneous sound output mode, the first audio output driver 640 in the signal processing device 170 may output a first audio signal Sada, having passed through a low-pass filter 642, to the audio output device 185.

Meanwhile, in the simultaneous sound output mode, the second audio output driver 645 in the signal processing device 170 may output a second audio signal Sadb, which is a full-band signal, to the interface 130a.

Accordingly, in the simultaneous sound output mode, the first sound which is low-pass filtered may be output from the audio output device 185, and the second sound which is a full-band sound signal may be output from the sound output device 400.

Meanwhile, in the single sound output mode, the first audio output driver 640 in the signal processing device 170 may output a third audio signal Stt, which is a full-band signal that does not pass through the low-pass filter 642, to the audio output device 185.

Accordingly, in the single sound output mode, the third sound which is a full-band sound signal may be output from the audio output device 185.

Meanwhile, the signal processing device 170 may further include an audio driver 607 configured to process an audio signal, a video driver 609 configured to process a video signal, an audio delay table 621, and a video delay table 623.

Meanwhile, an audio signal Sao processed by the audio driver 607 may be input to the delay controller 611.

Meanwhile, a video signal Svo processed by the video driver 609 may be input to the delay controller 611.

Meanwhile, the audio delay table 621 may output, to the delay controller 611, audio processing time information FDa for the audio driver 607 in an audio format.

In this case, the audio processing time information FDa for the audio driver 607 in an audio format may correspond to audio processing time information for the audio output device 185.

Meanwhile, the video delay table 623 may output, to the delay controller 611, video processing time information FDv for the video driver 609 in a video format.

Meanwhile, in the simultaneous sound output mode, the delay controller 611 in the signal processing device 170 may calculate a first additional delay time of the first audio signal Stv based on the audio format information of the sound output device 400 or the audio processing time information Sd of the sound output device 400.

Meanwhile, in the simultaneous sound output mode, the delay controller 611 in the signal processing device 170 may calculate a first additional delay time of the first audio signal and a second additional delay time of the second audio signal based on a video processing time of an input video signal in the video driver 609, the audio processing time information Sd corresponding to the audio format information of the sound output device 400, an audio processing time in the audio driver 609, and a time of output processing to the sound output device 400.

Specifically, in the simultaneous sound output mode, the delay controller 611 in the signal processing device 170 may perform control to increase the first additional delay time of the first audio signal, as the video processing time of the input video signal in the video driver 609 increases, or the audio processing time based on the audio format information of the sound output device 400 increases, or the audio processing time in the audio driver 609 decreases, or the time of output processing to the sound output device 400 increases.

Meanwhile, in the simultaneous sound output mode, the delay controller 611 in the signal processing device 170 may perform control to increase the second additional delay time of the second audio signal, as the video processing time of the input video signal in the video driver 609 increases, or the audio processing time based on the audio format information of the sound output device 400 decreases, or the audio processing time in the audio driver 609 decreases, or the time of output processing to the sound output device 400 decreases.

Meanwhile, if the video processing time of the input video signal is greater than a sum of delays of the sound output device 400, the delay controller 611 in the signal processing device 170 may calculate a first additional delay time and a second additional delay time based on the video processing time of an output video signal.

That is, the second additional delay time may be less than the first additional delay time. Accordingly, sound synchronized with a video signal may be output from the audio output device 185 and the sound output device 400.

Meanwhile, if a sum of delays of the sound output device 400 is greater than the video processing time of the input video signal, the delay controller 611 in the signal processing device 170 may calculate a first additional delay time and a second additional delay time based on the sum of delays of the sound output device 400. Accordingly, sound synchronized with a video signal may be output from the audio output device 185 and the sound output device 400.

Meanwhile, in the single sound output mode, the delay controller 611 in the signal processing device 170 may output a third audio signal based on a calculated third additional delay time, while ignoring the audio format information of the sound output device 400 or the audio processing time information Sd of the sound output device 400.

Meanwhile, in the single sound output mode, the delay controller 611 in the signal processing device 170 may calculate a third additional delay time of the third audio signal based on the video processing time of the input video signal, while ignoring the audio format information of the sound output device 400 or the audio processing time information Sd of the sound output device 400.

Meanwhile, in the single sound output mode, the delay controller 611 in the signal processing device 170 may calculate a third additional delay time of the third audio signal based on the video processing time of the input video signal in the video driver 609 and the audio processing time in the audio driver 609, while ignoring the audio format information of the sound output device 400 or the audio processing time information Sd of the sound output device 400.

For example, in the single sound output mode, if a video processing time of the input video signal in the video driver 609 is greater than an audio processing time in the audio driver 609, the delay controller 611 in the signal processing device 170 may calculate a third additional delay time of the third audio signal for synchronization with the video signal.

Specifically, in the single sound output mode, if a video processing time of the input video signal in the video driver 609 is greater than an audio processing time in the audio driver 609, the delay controller 611 in the signal processing device 170 may perform control to increase a third additional delay time as the video processing time of the input video signal increases or as the audio processing time in the audio driver 609 decreases.

That is, in the single sound output mode, the delay controller 611 in the signal processing device 170 may calculate a third additional delay time based on the audio processing time information for the audio output device 185, and may output a third audio signal based on the calculated third additional delay time.

Meanwhile, if the sound output device 400 is turned off during operation in the simultaneous sound output mode, the signal processing device 170 may perform control to switch to a single sound output mode in which the audio output device 185 solely outputs sound. Accordingly, it is possible to rapidly switch from the simultaneous sound output mode to the single sound output mode.

Figure 7A:
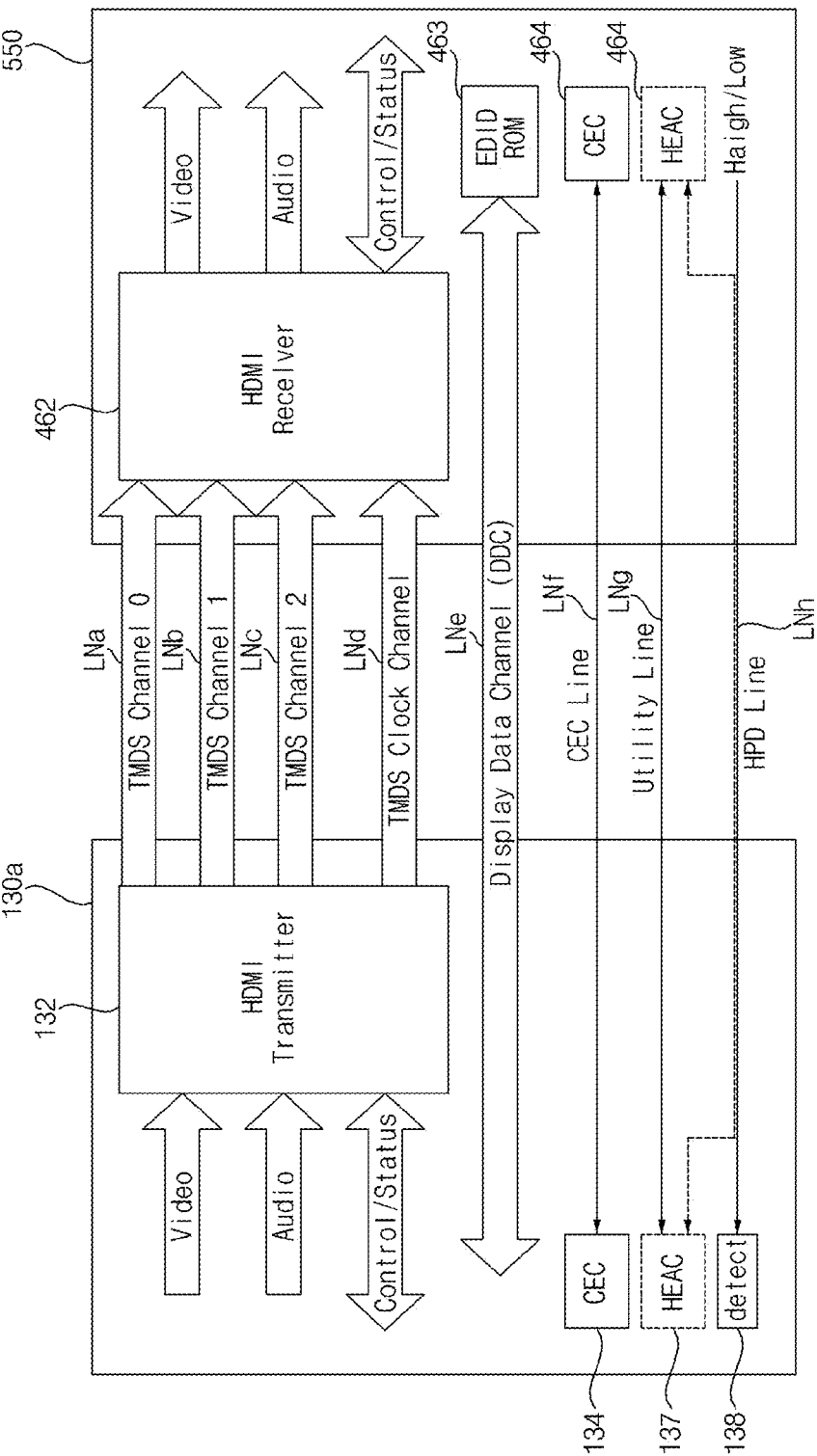
FIGS. 7A and 7B are diagrams referred to in the description of FIG. 6.
Figure 7B:
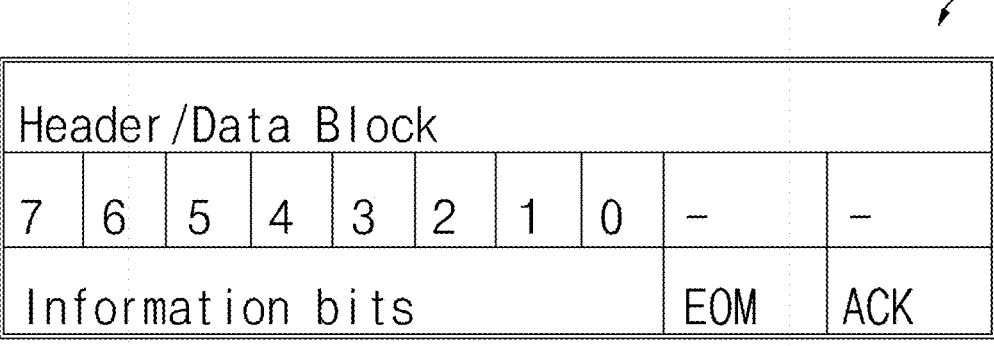

FIGS. 7A and 7B are diagrams referred to in the description of FIG. 6.

First, FIGS. 7A and 7B are diagrams illustrating an example of an interface scheme between an image display apparatus and a sound output device.

Referring to the drawings, the image display apparatus 100 and the sound output device 400 may perform HDMI communication as a fixed-line interface method.

In the drawings, an HDMI transmitter 132 may be included in the interface 130a of the image display apparatus 100, and an HDMI receiver 462 may be included in the interface 550 of the sound output device 400.

A plurality of Transition-Minimized Differential Signaling (TMDS) lines Lna to Lnd, a Display Data Channel (DDC) line Lne, a CEC line LNf, a Utility line LNg, and an HPD line LNh may be disposed between the HDMI transmitter 132 and the HDMI receiver 462.

Meanwhile, after the sound output device 400 is turned on, the interface 130a of the image display apparatus 100 may receive the audio format information of the sound output device 400 or the audio processing time information Sd of the sound output device 400 through a first transmission line LNf.

That is, the interface 130a of the image display device 100 may receive the audio format information of the sound output device 400 or the audio processing time information Sd of the sound output device 400 through the CEC line LNf.

Meanwhile, in the simultaneous sound output mode, the interface 130a of the image display apparatus 100 may transmit the second audio signal Sau to the sound output device 400 through a second transmission line LNa or LNb. Accordingly, sound synchronization may be performed in case in which the sound output device 400 and the image display apparatus 100 simultaneously output sound.

FIG. 7B is a diagram illustrating a CEC data format of the CEC line in FIG. 7A.

Referring to the drawing, a CEC data format 700 may include a plurality of information bits, EOM, and ACK.

In accordance with a CEC data format 700 of FIG. 7B, the interface 550 of the sound output device 400 may transmit the audio format information of the sound output device 400 or the audio processing time information Sd of the sound output device 400.

Figure 8A:
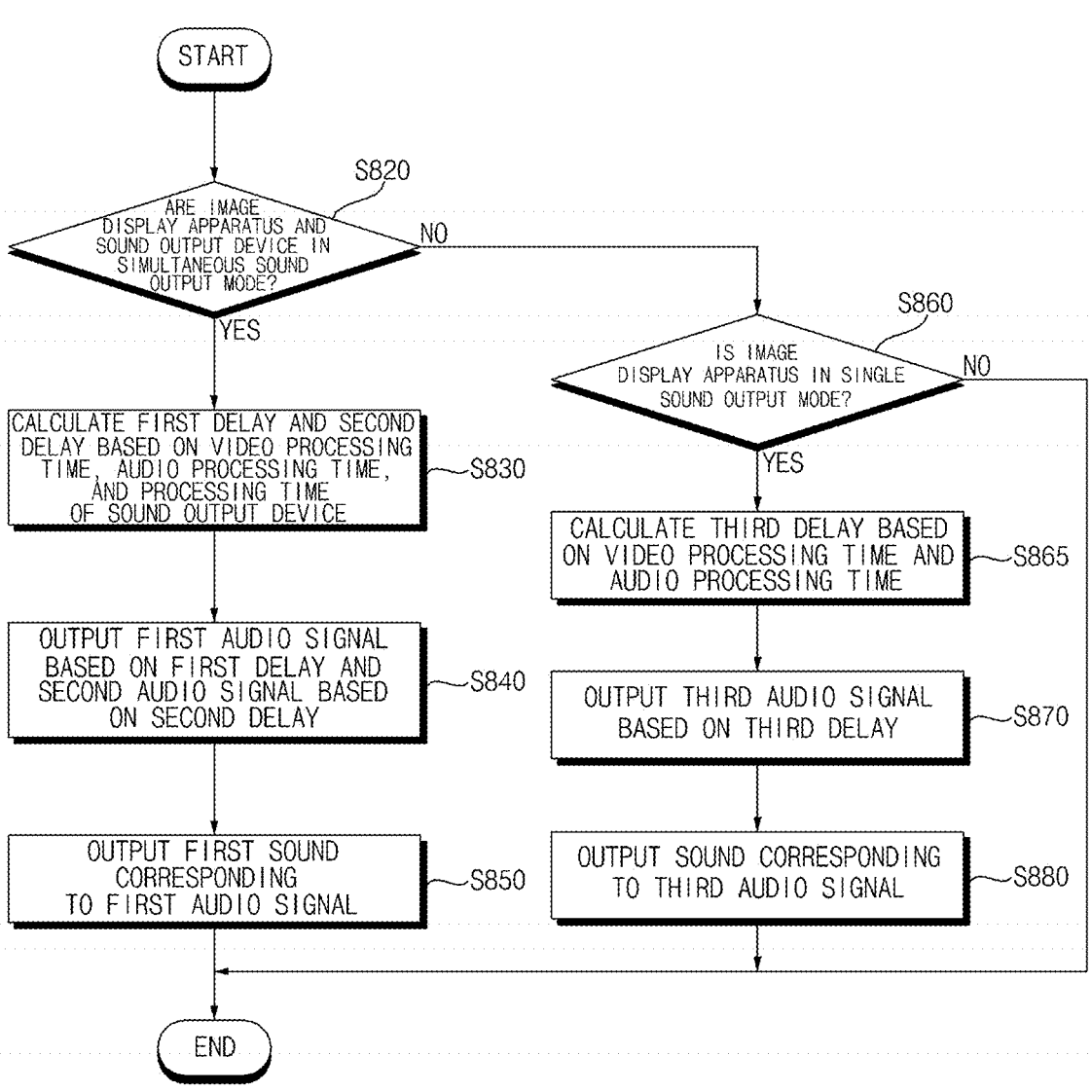
FIG. 8A is a flowchart illustrating an operating method of an image display apparatus according to an embodiment of the present disclosure.

FIG. 8A is a flowchart illustrating an operating method of an image display apparatus according to an embodiment of the present disclosure.

Referring to the drawing, the signal processing device 170 in the image display apparatus 100 according to an embodiment of the present disclosure determines whether the sound output device 400 and the audio output device 185 are in a simultaneous sound output mode (S820).

The signal processing device 170 may determine whether the simultaneous sound output mode is set, based on an input signal while the settings screen is displayed.

If the simultaneous sound output mode is set, the signal processing device 170 may calculate a first additional delay time of a first audio signal and a second additional delay time of a second audio signal based on the audio format information of the sound output device 400 or the audio processing time information Sd of the sound output device 400 (S830).

If the simultaneous sound output mode is set, the signal processing device 170 may calculate a first additional delay time of a first audio signal and a second additional delay time of a second audio signal based on the video processing time of the input video signal in the video driver 609, the audio processing time information Sd corresponding to the audio format information of the sound output device 400, the audio processing time in the audio driver 609, and the time of output processing to the sound output device 400.

Specifically, in the simultaneous sound output mode, the signal processing device 170 may perform control to increase the first additional delay time of the first audio signal, as the video processing time of the input video signal in the video driver 609 increases, or the audio processing time based on the audio format information of the sound output device 400 increases, or the audio processing time in the audio driver 609 decreases, or the time of output processing to the sound output device 400 increases.

Meanwhile, in the simultaneous sound output mode, the signal processing device 170 may perform control to increase the second additional delay time of the second audio signal, as the video processing time of the input video signal in the video driver 609 increases, or the audio processing time based on the audio format information of the sound output device 400 decreases, or the audio processing time in the audio driver 609 decreases, or the time of output processing to the sound output device 400 decreases.

Meanwhile, if the video processing time of the input video signal is greater than a sum of delays of the sound output device 400, the signal processing device 170 may calculate a first additional delay time and a second additional delay time based on the video processing time of an output video signal.

For example, in the simultaneous sound output mode, if a video processing time of the input video signal in the video driver 609 is 100 ms, an audio processing time of a PCM audio signal which is a first audio format in the audio driver 607 is 10 m, an audio processing time of the PCM audio signal in the sound output device 400 is 70 ms, and a time of output processing to the sound output device 400 is 20 m, the video processing time has a greatest delay, such that a total delay may be set to 100 ms, the first additional delay time may be set to 90 ms which is 100 ms-10 ms, and the second additional delay time may be set to 10 ms which is 100 ms–(70 ms+20 ms).

That is, the second additional delay time may be less than the first additional delay time. Accordingly, sound synchronized with the video signal may be output from the audio output device 185 and the sound output device 400.

Meanwhile, if the sum of delays of the sound output device 400 is greater than the video processing time of the input video signal, the signal processing device 170 may calculate a first additional delay time and a second additional delay time based on the sum of delays of the sound output device 400.

For example, in the simultaneous sound output mode, if a video processing time of the input video signal in the video driver 609 is 100 ms, an audio processing time of a DTS audio signal which is a second audio format in the audio driver 607 is 20 m, an audio processing time of the DTS audio signal in the sound output device 400 is 120 ms, and a time of output processing to the sound output device 400 is 20 m, not the video processing time but the sum of delays of the sound output device 400 has a greatest delay, such that a total delay may be set to 120 ms+20 ms=140 ms, the additional delay time of the video may be set to 40 ms which is 140 ms-100 ms, the first additional delay time may be set to 130 ms which is 140 ms-10 ms, and the second additional delay time may be set to 0 ms by considering 140 ms. Accordingly, sound synchronized with the video signal may be output from the audio output device 185 and the sound output device 400.

Then, the signal processing device 170 may output a first audio signal for the audio output device 185 based on the calculated first delay time, and may output a second audio signal for the sound output device 400 based on the calculated second delay time (S840).

Subsequently, the audio output device 185 may output a first sound corresponding to the first audio signal (S850). Accordingly, sound synchronized with the video signal may be output from the audio output device 185 and the sound output device 400.

Meanwhile, in operation 820 (S820), if the simultaneous sound output mode is not set, the signal processing device 170 determines whether a single sound output mode is set (S860) in which the audio output device 185 solely outputs sound.

The signal processing device 170 may determine whether the single sound output mode is set, based on an input signal while the settings screen is displayed.

If the single sound output mode is set, the signal processing device 170 may output a third audio signal based on a calculated third additional delay time (S870), while ignoring the audio format information of the sound output device 400 or the audio processing time information Sd of the sound output device 400.

If the single sound output mode is set, the signal processing device 170 may calculate a third additional delay time of the third audio signal based on the video processing time of the input video signal, while ignoring the audio format information of the sound output device 400 or the audio processing time information Sd of the sound output device 400.

In the single sound output mode, the signal processing device 170 may calculate a third additional delay time of the third audio signal based on the video processing time of the input video signal in the video driver 609 and the audio processing time in the audio driver 609, while ignoring the audio format information of the sound output device 400 or the audio processing time information Sd of the sound output device 400.

For example, in the single sound output mode, if the video processing time of the input video signal in the video driver 609 is greater than the audio processing time in the audio driver 609, the signal processing device 170 may calculate a third additional delay time of the third audio signal for synchronization with the video signal.

Specifically, in the single sound output mode, if the video processing time of the input video signal in the video driver 609 is greater than the audio processing time in the audio driver 609, the signal processing device 170 may perform control to increase the third additional delay time as the video processing time of the input video signal increases or the audio processing time in the audio driver 609 decreases.

For example, if the video processing time of the input video signal in the video driver 609 is 100 ms, and the audio processing time of the PCM audio signal in the audio driver 607 is 10 m, the signal processing device 170 may calculate 90 ms, which is a difference between the times, as the third additional delay time.

In another example, if the video processing time of the input video signal in the video driver 609 is 100 ms, and the audio processing time of the DTS audio signal in the audio driver 607 is 20 m, the signal processing device 170 may calculate 80 ms, which is a difference between the times, as the third additional delay time.

That is, in the single sound output mode, the signal processing device 170 may calculate the third additional delay time based on the audio processing time information for the audio output device 185, and may output the third audio signal based on the calculated third additional delay time.

Then, the audio output device 185 may output a third sound corresponding to the third audio signal (S880).

Meanwhile, the first additional delay time of the first sound in operation S850 (S850) may be greater than or equal to the third additional delay time of the third sound in operation 880 (S880). That is, the third additional delay time may be equal to or less than the first additional delay time.

For example, in the case where the third additional delay time is less than the first additional delay time, sound with less delay may be output when the image display apparatus 100 solely outputs sound.

Figure 8B:
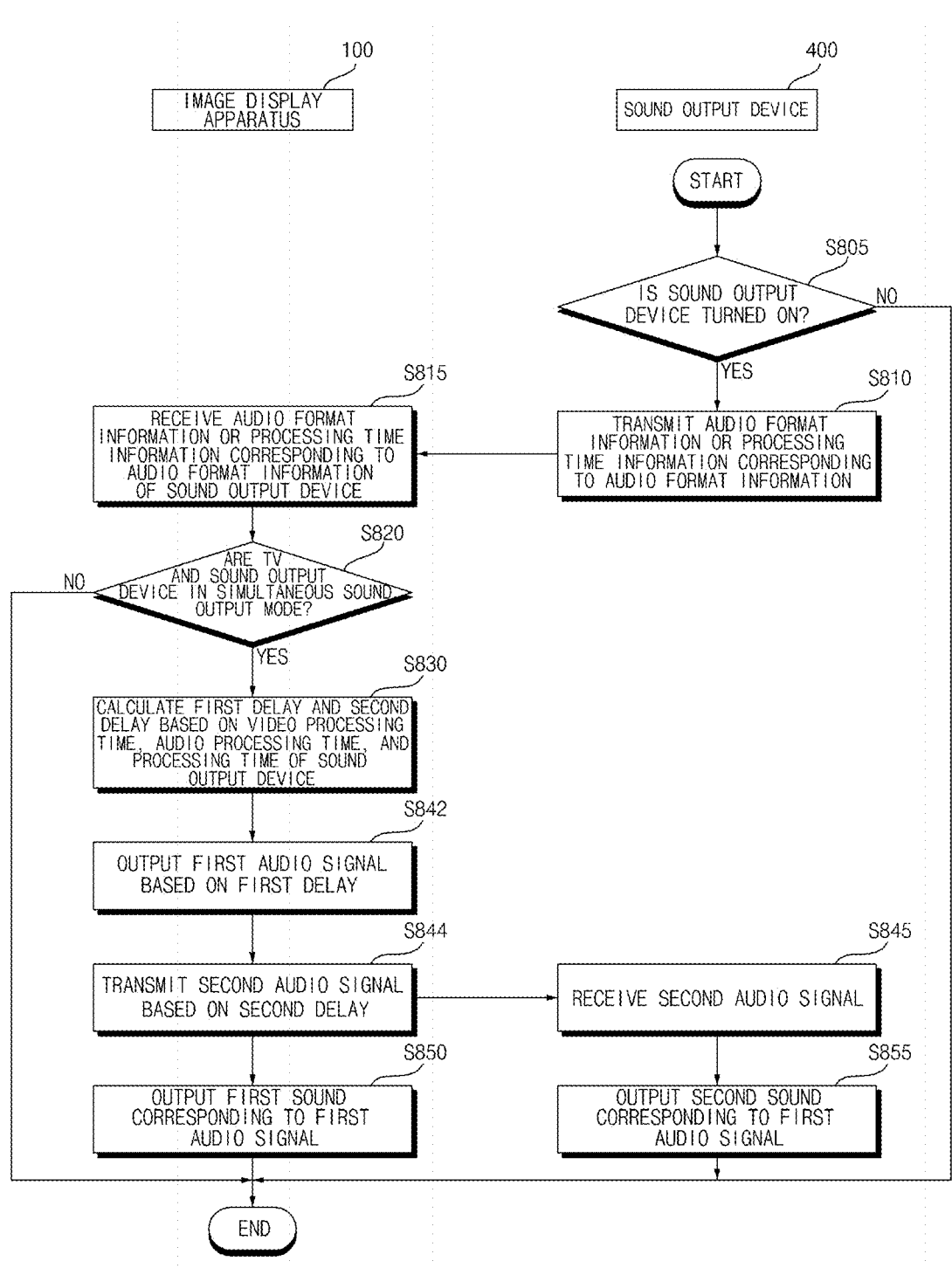
FIG. 8B is a flowchart illustrating an operating method of an image display apparatus according to another embodiment of the present disclosure.

FIG. 8B is a flowchart illustrating an operating method of an image display apparatus according to another embodiment of the present disclosure.

Referring to the drawing, when the sound output device 400 is turned on (S805), the interface 550 of the sound output device 400 may transmit audio format information of the sound output device 400 or audio processing time information Sd of the sound output device 400 (S810).

In response, the interface 130a in the image display apparatus 100 may receive the audio format information of the sound output device 400 or the audio processing time information Sd of the sound output device 400 (S815).

Then, the signal processing device 170 determines whether a simultaneous sound output mode is set (S820) in which the sound output device 400 and the audio output device 185 simultaneously output sound.

The signal processing device 170 may determine whether the simultaneous sound output mode is set while the settings screen is displayed.

If the simultaneous sound output mode is set, the signal processing device 170 may calculate a first additional delay time for a first audio signal and a second additional delay time for a second audio signal based on the audio format information of the sound output device 400 or the audio processing time information Sd of the sound output device 400 (S830).

Subsequently, the signal processing device 170 may output a first audio signal for the audio output device 185 based on the calculated first additional delay time (S842).

Next, the signal processing device 170 may output the second audio signal for the sound output device 400 based on the calculated second additional delay time, and the interface 130a in the image display apparatus 100 may transmit the second audio signal (S844).

In response, the interface 550 of the sound output device 400 may receive the second audio signal based on the second additional delay time (S845), and the audio output device 560 of the sound output device 400 may output a second sound corresponding to the second audio signal (S855).

Meanwhile, the audio output device 185 of the image display apparatus 100 may output a first sound corresponding to the first audio signal based on the first additional delay time (S850).

As the first sound with adjusted delay time is output from the audio output device 185 of the image display apparatus 100, along with the second sound which is output from the sound output device 400, sound synchronization may be performed in case in which the sound output device 400 and the image display apparatus simultaneously output sound.

Figure 9A:
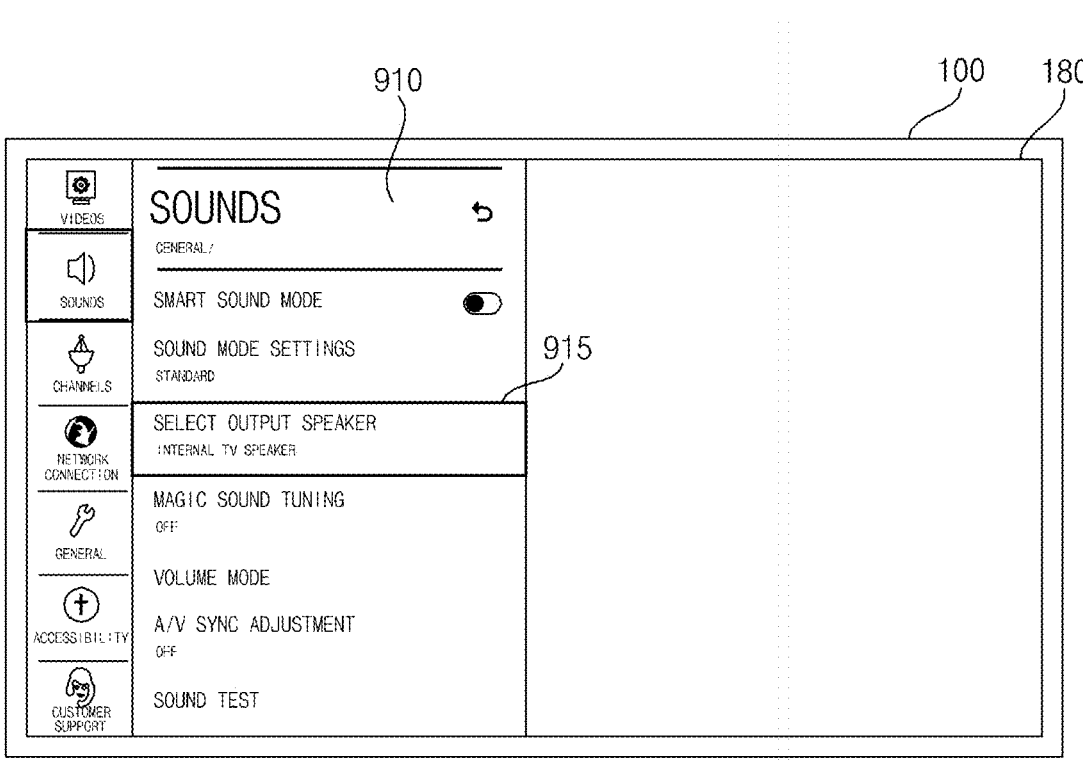
FIGS. 9A to 11B are diagrams referred to in the description of FIGS. 8A and 8B.

FIG. 9A is a diagram illustrating an example of a sound settings screen.

Referring to the drawing, the signal processing device 170 may perform control to display a sound settings screen 910 based on an input signal of a remote controller 200 and the like.

The sound settings screen 910 may include a sound mode setting item, an output speaker selection item 915, a sync adjustment item, and the like.

Figure 9B:
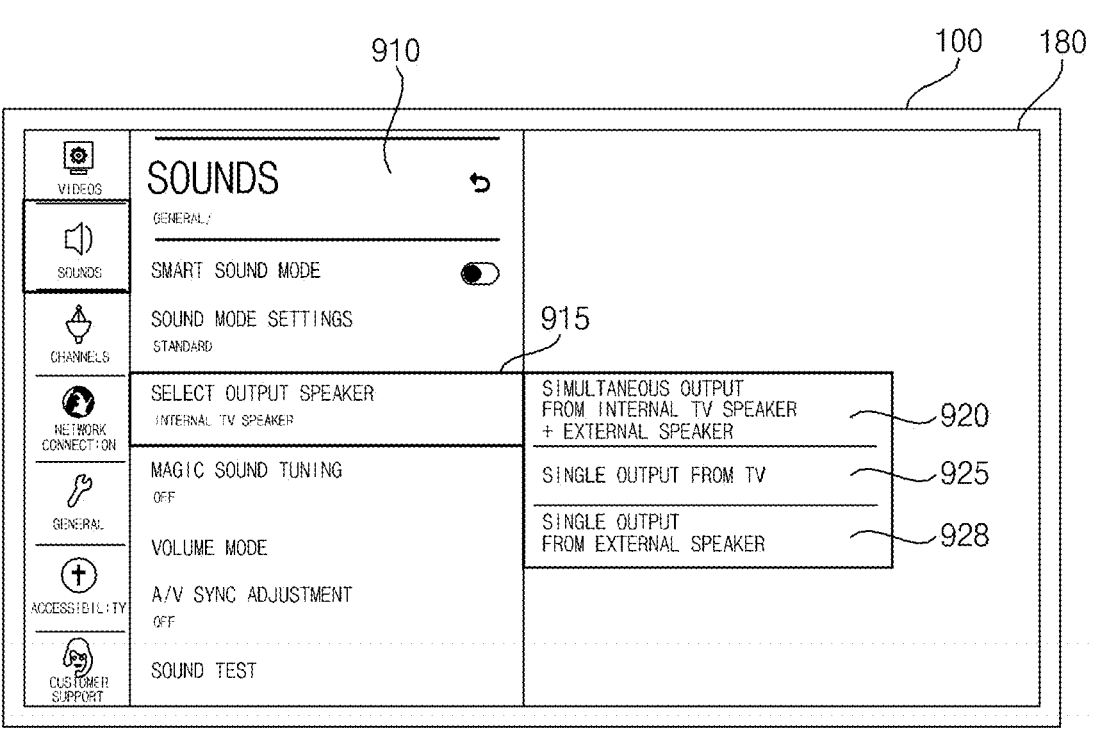

If the output speaker selection item 915 is selected, the signal processing device 170 may perform control to display an item 920 for simultaneous sound output, an item 925 for single sound output from the image display apparatus, and an item 928 for single sound output from the sound output device, as illustrated in FIG. 9B.

If the item 920 for simultaneous sound output is selected, the signal processing device 170 may be configured to perform the simultaneous sound output mode.

If the item 925 for single sound output from the image display apparatus is selected, the signal processing device 170 may be configured to perform the single sound output mode in which the audio output device 185 solely outputs sound.

Meanwhile, if the item 928 for single sound output from the sound output device is selected, the signal processing device 170 may be configured to perform the single sound output mode in which the sound output device solely outputs sound.

Figure 10A:
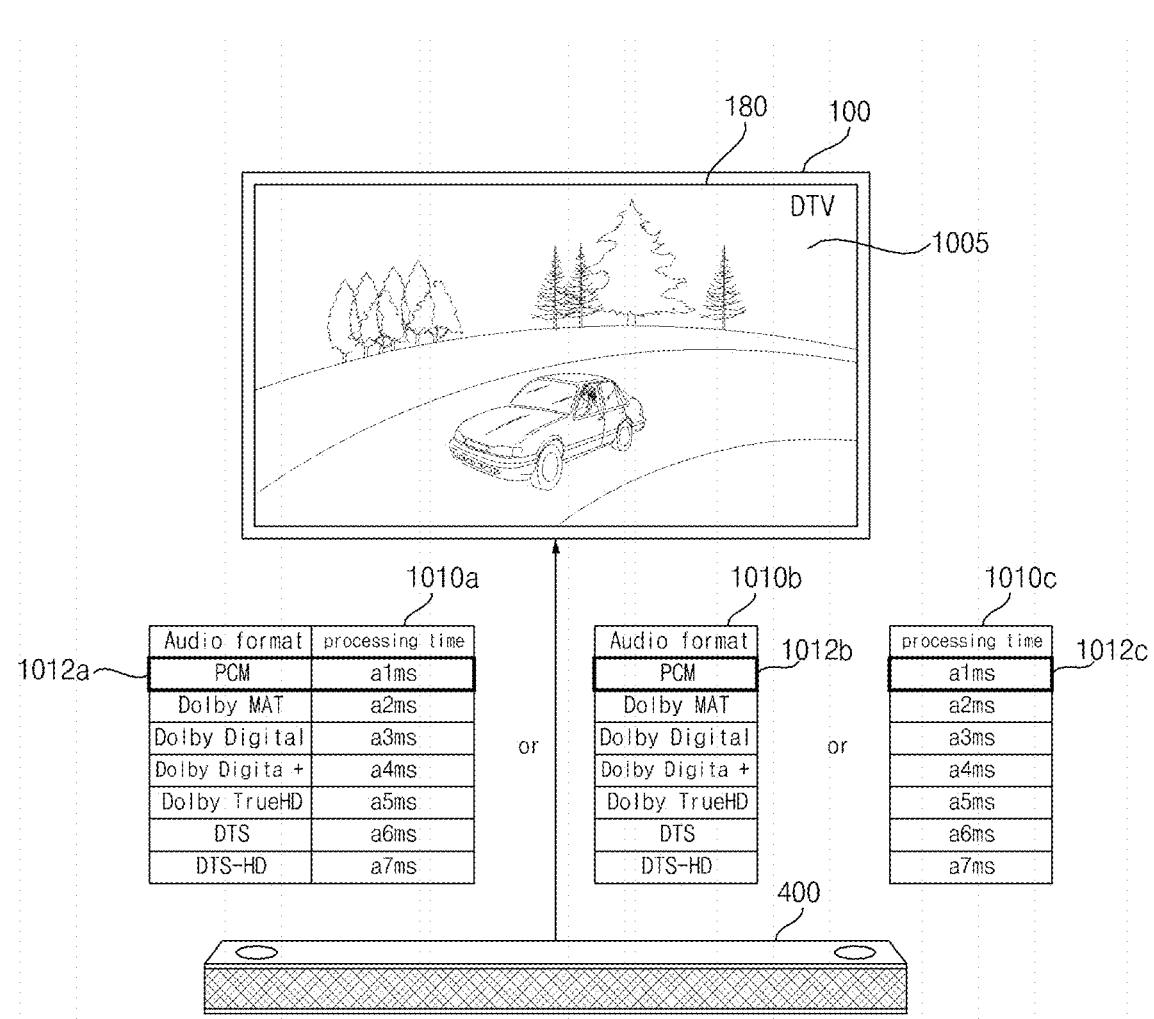

FIG. 10A is a diagram illustrating an example of receiving audio format information or audio processing time information from the sound output device 400.

Referring to the drawing, after the sound output device 400 is turned on, the signal processing device 170 of the image display apparatus 100 may receive table information 1010a including a plurality of audio formats and audio processing time information corresponding to the plurality of audio formats.

Alternatively, after the sound output device 400 is turned on, the signal processing device 170 of the image display apparatus 100 may receive first audio format information of the corresponding sound output device and audio processing time information 1012a corresponding to the first audio format information.

Alternatively, after the sound output device 400 is turned on, the signal processing device 170 of the image display apparatus 100 may receive table information 1010b including a plurality of audio formats.

Alternatively, after the sound output device 400 is turned on, the signal processing device 170 of the image display apparatus 100 may receive first audio format information 1012b of the corresponding sound output device.

Accordingly, based on the first audio format information 1012b of the corresponding sound output device, the signal processing device 170 of the image display apparatus 100 may access an external server 600 and the like, to receive audio processing time information corresponding to the first audio format information 1012b of the corresponding sound output device.

Alternatively, after the sound output device 400 is turned on, the signal processing device 170 of the image display apparatus 100 may receive table information 1010c including audio processing time information corresponding to a plurality of audio formats.

Alternatively, after the sound output device 400 is turned on, the signal processing device 170 of the image display apparatus 100 may receive audio processing time information 1012c corresponding to the first audio format.

Figure 10B:
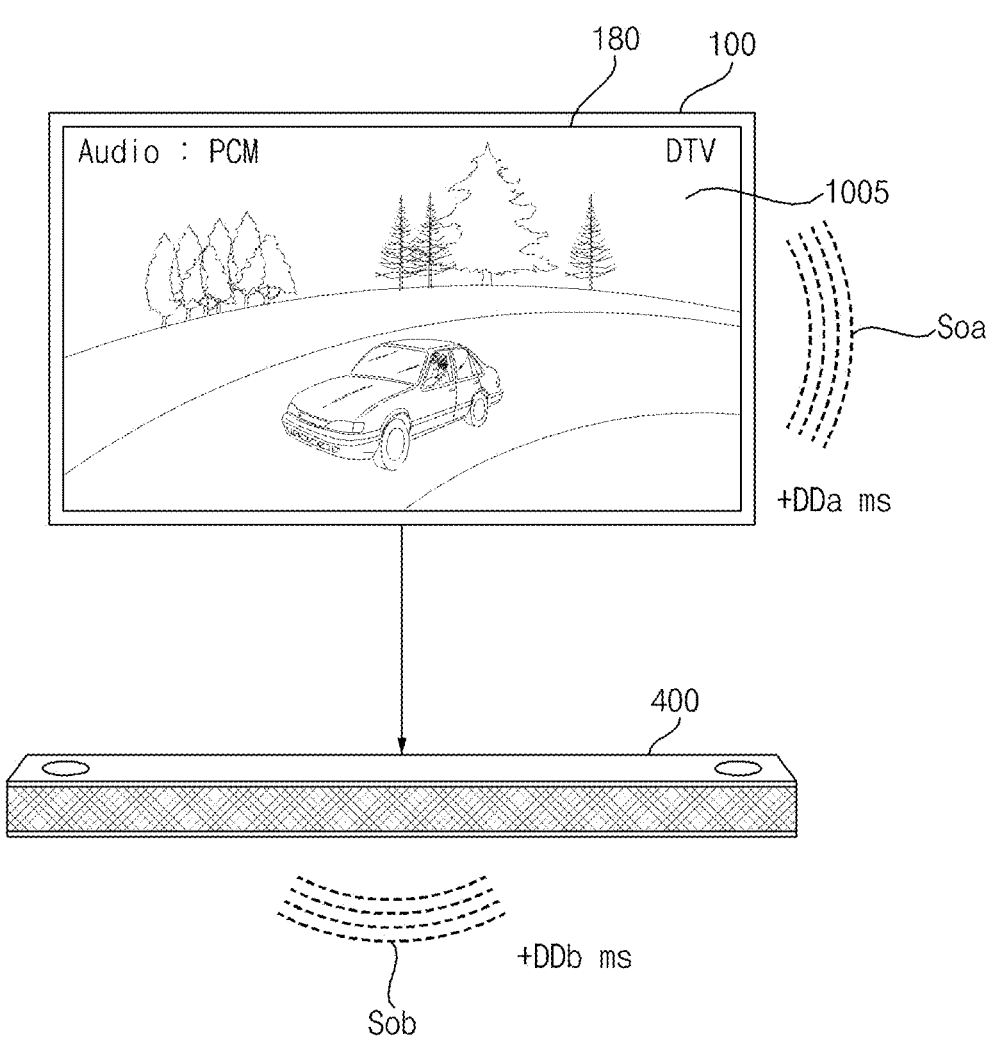

FIG. 10B is a diagram illustrating an example of a simultaneous sound output mode.

Referring to the drawing, while a broadcast video 1005 is displayed, the signal processing device 170 may calculate a first additional delay time DDa based on audio format information or audio processing time information of the sound output device 400, and may output a first audio signal Stv based on the calculated first additional delay time DDa.

Accordingly, the audio output device 185 in the image display apparatus 100 outputs a first sound Soa corresponding to the first audio signal based on the first additional delay time DDa.

Meanwhile, while the broadcast video 1005 is displayed, the signal processing device 170 may calculate a second additional delay time DDb based on the audio format information or audio processing time information of the sound output device 400, and may output a second audio signal Sau based on the calculated second additional delay time DDb.

Meanwhile, the sound output device 400 outputs a second sound Sob based on the second audio signal Sau from the signal processing device 170.

For example, in the simultaneous sound output mode, if a video processing time of an input video signal in the video driver 609 is 100 ms, an audio processing time of a PCM audio signal in the audio driver 607 is 10 m, an audio processing time of the PCM audio signal in the sound output device 400 is 70 ms, and a time of output processing to the sound output device 400 is 20 m, the video processing time has a greatest delay, such that a total delay may be set to 100 ms, the first additional delay time may be set to 90 ms which is 100 ms-10 ms, and the second additional delay time may be set to 10 ms which is 100 ms-(70 ms+20 ms).

That is, the second additional delay time may be less than the first additional delay time. Accordingly, sound synchronized with the video signal may be output from the audio output device 185 and the sound output device 400.

Figure 10C:
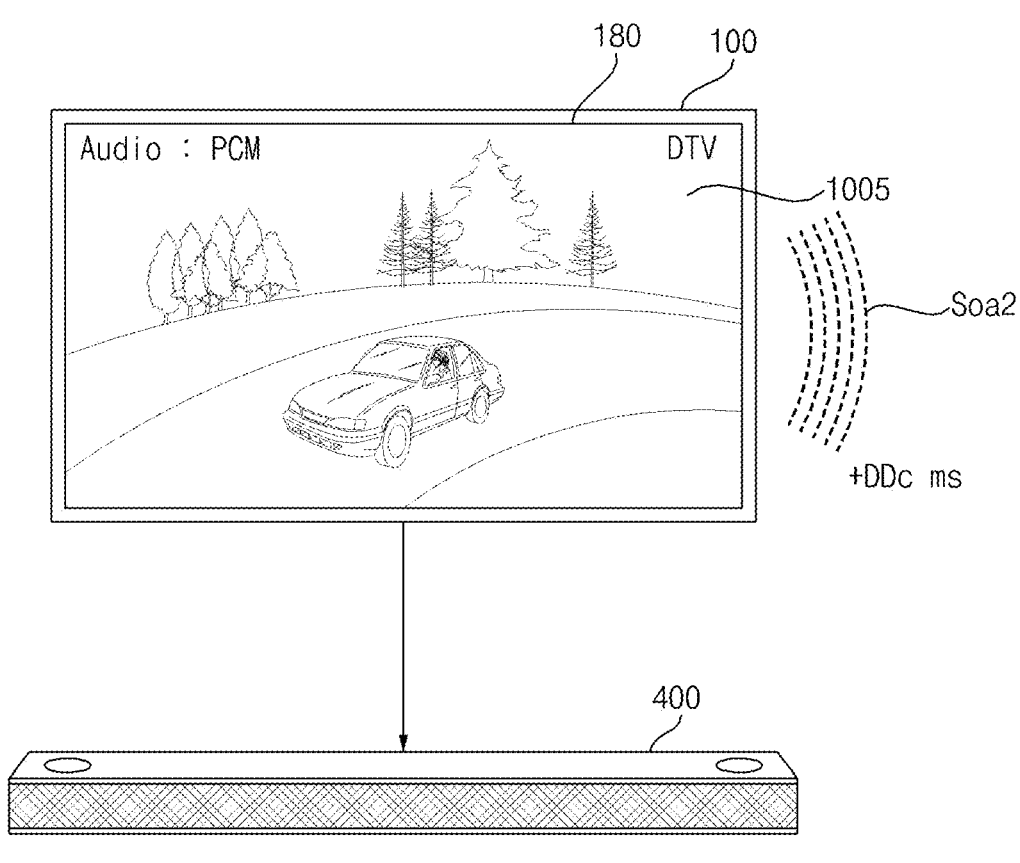

FIG. 10C is a diagram illustrating an example of a single sound output mode in which the image display apparatus solely outputs sound.

Referring to the drawing, in the single sound output mode in which the image display apparatus solely outputs sound while a broadcast video 1005 is displayed, the signal processing device 170 may calculate a third additional delay time DDc of a third audio signal based on a video processing time of an input video signal, while ignoring audio format information or audio processing time information of the sound output device 400, and may output a third audio signal Stt based on the calculated third additional delay time DDc.

Accordingly, the audio output device 185 in the image display apparatus 100 outputs a third sound Soa2 corresponding to the third audio signal Stt.

Meanwhile, the sound output device 400 does not output sound.

For example, if the video processing time of the input video signal in the video driver 609 is 100 ms, and the audio processing time of the PCM audio signal in the audio driver 607 is 10 m, the signal processing device 170 may calculate 90 ms, which is a difference between the times, as the third additional delay time.

Meanwhile, while the broadcast video 1005 is displayed on the display 180, the signal processing device 170 may perform control so that the first additional delay time DDa of the first sound Soa based on the first audio signal STv output from the audio output device 185 may be greater than or equal to the third additional delay time DDc of the third sound Soa2 based on the third audio signal Stt output from the audio output device 185.

In comparison of FIG. 10B with FIG. 10C, the first additional delay time DDa of FIG. 10B, which is 90 ms, may be equal to the third additional delay time DDc of FIG. 10C which is 90 ms.

Figure 10D:
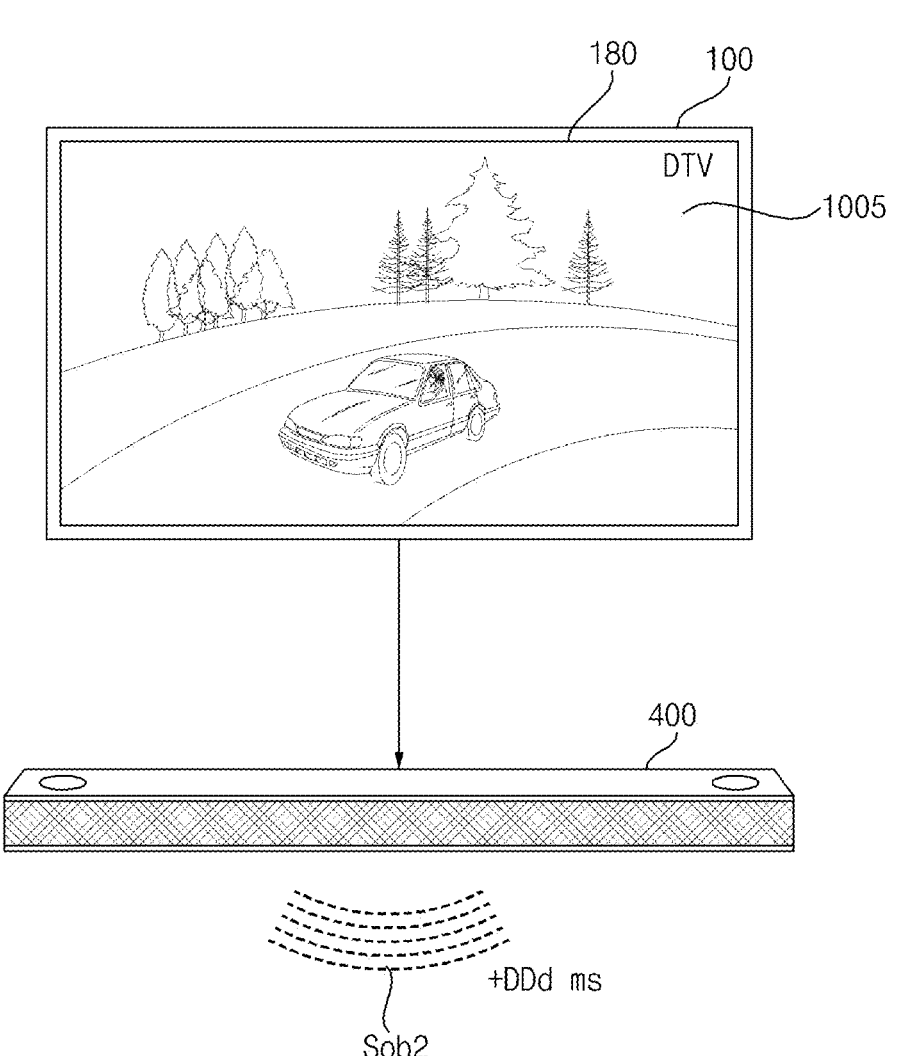

FIG. 10D is a diagram illustrating an example of a single sound output mode in which a sound output device solely outputs sound.

Referring to the drawing, in the single sound output mode in which the sound output device 400 solely outputs sound while the broadcast video 1005 is displayed, the signal processing device 170 may output an audio signal to the sound output device 400 without outputting the audio signal to the audio output device 185.

Accordingly, the audio output device 185 in the image display apparatus 100 does not output sound, and the sound output device 400 may solely output a fourth sound Sob2 which is the only sound output.

In the single sound output mode in which the sound output device 400 solely outputs sound, the signal processing device 170 may calculate a fourth additional delay time DDd based on a video processing time of an input video signal in the video driver 609, an audio processing time in the sound output device 400, and a time of output processing to the sound output device 400, and may output the fourth audio signal based on the fourth additional delay time DDd to the sound output device 400.

Meanwhile, the fourth additional delay time DDd may be equal to the second additional delay time DDb.

Figure 11A:
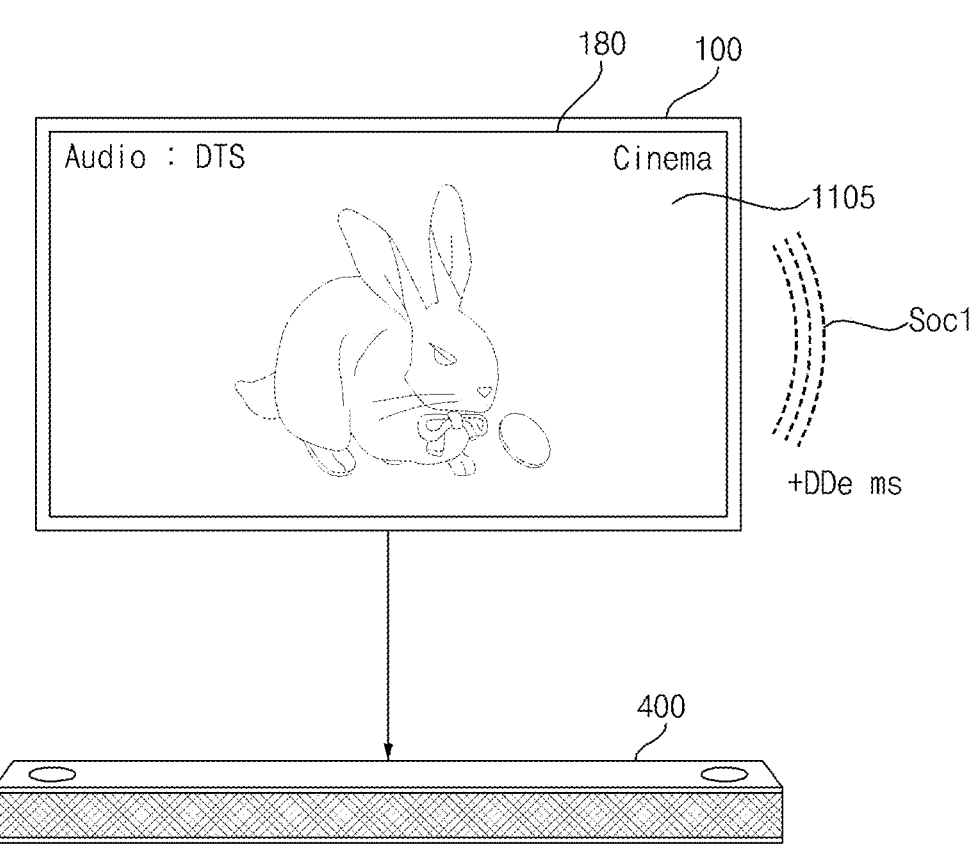

FIG. 11A is a diagram illustrating another example of a single sound output mode in which the image display apparatus solely outputs sound.

Referring to the drawing, in the single sound output mode in which the image display apparatus solely outputs sound while a cinema video 1105 is displayed, the signal processing device 170 may calculate a third additional delay time DDe based on video processing time information of an input video signal and audio processing time information for the audio output device 185, while ignoring audio format information or audio processing time information of the sound output device 400, and may output a third audio signal Stt based on the calculated additional delay time DDe.

For example, if the video processing time of the input video signal in the video driver 609 is 100 ms, and the audio processing time of the DTS audio signal in the audio driver 607 is 20 m, the signal processing device 170 may calculate 80 ms, which is a difference between the times, as the third additional delay time DDe.

Accordingly, the audio output device 185 in the image display apparatus 100 outputs a third sound Soc1 corresponding to the third audio signal Stt based on the third additional delay time DDe. Meanwhile, the sound output device 400 does not output sound.

Figure 11B:
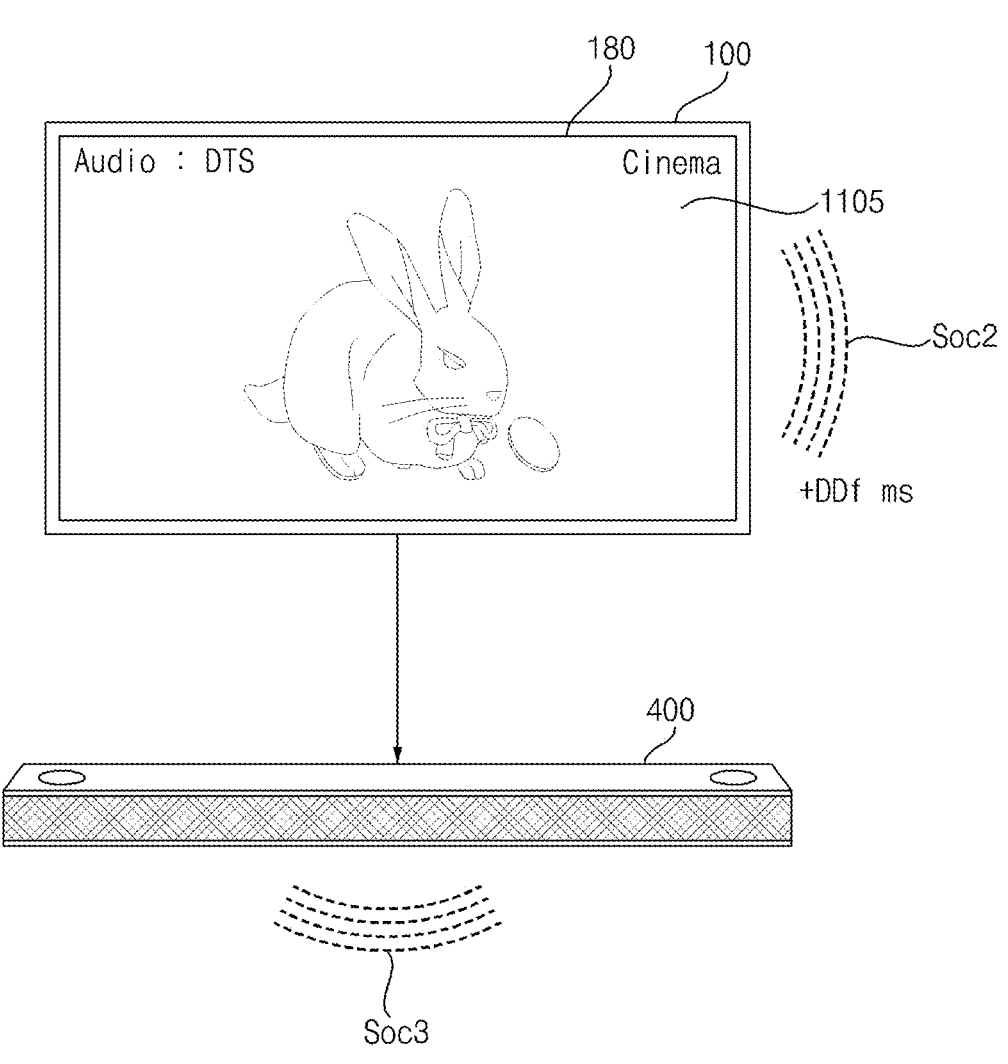

FIG. 11B is a diagram illustrating an example of a simultaneous sound output mode.

Referring to the drawing, in the simultaneous sound output mode, the signal processing device 170 may calculate a first additional delay time DDf of a first audio signal Stv and a second additional delay time DDg of a second audio signal Sau based on a video processing time of an input video signal in the video driver 609, audio processing time information Sd corresponding to audio format information of the sound output device 400, an audio processing time in the audio driver 609, and a time of output processing to the sound output device 400.

Accordingly, the audio output device 185 in the image display apparatus 100 may output a first sound Soc2 corresponding to the first audio signal.

Meanwhile, the sound output device 400 outputs a second sound Soc3 based on a second audio signal Sau from the signal processing device 170.

For example, in the simultaneous sound output mode, if a video processing time of the input video signal in the video driver 609 is 100 ms, an audio processing time of a DTS audio signal in the audio driver 607 is 20 m, an audio processing time of the DTS audio signal in the sound output device 400 is 120 ms, and a time of output processing to the sound output device 400 is 20 m, not the video processing time but the sum of delays of the sound output device 400 has a greatest delay, such that a total delay may be set to 120 ms+20 ms=140 ms, the additional delay time of the video may be set to 40 ms which is 140 ms-100 ms, the first additional delay time may be set to 130 ms which is 140 ms-10 ms, and the second additional delay time may be set to 0 ms by considering 140 ms. Accordingly, sound synchronized with the video signal may be output from the audio output device 185 and the sound output device 400.

That is, as illustrated in the drawing, the output time of the first sound Soc2 coincides with the delay time of the second sound Soc3. Accordingly, when the image display apparatus 100 and the sound output device 400 simultaneously output sound, surround sound may be output.

Meanwhile, in comparison of FIG. 10B with FIG. 11B, the signal processing device 170 may perform control so that the additional delay time DDf of the first sound Soc2 based on the first audio signal output from the audio output device 185 while the cinema video 1105 is displayed on the display 180, may be greater than the additional delay time DDa of the first sound based on the first audio signal output from the audio output device 185 while the broadcast video 1005 is displayed on the display 180.

As described above, the additional delay time DDf of the first sound Soc2 of FIG. 11B may be 130 ms which is 140 ms-10 ms, and the additional delay time DDa of the first sound Soa of FIG. 10B may be 90 ms.

It will be apparent that, although the preferred embodiments have been illustrated and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. An image display apparatus comprising:

a display;

an audio output device configured to output sound;

an interface configured to receive a plurality of audio format information of an external sound output device from the sound output device after the sound output device is turned on; and a signal processing device configured to:

receive the plurality of audio format information through the interface, in response to a simultaneous sound output mode of the sound output device and the audio output device, and an audio format of the sound output device corresponding to a first audio format information among the plurality of audio format information, calculate a first additional delay time based on a first audio processing time information of the sound output device corresponding to the first audio format information, output a first audio signal based on the first additional delay time to the audio output device and output a second audio signal based on a second additional delay time, which is less than the first additional delay time, to the sound output device, and in response to a single sound output mode of the audio output device, output a third audio signal to the audio output device, wherein the signal processing device is configured to control the first additional delay time based on the first audio signal output from the audio output device to be greater than or equal to a third additional delay time based on the third audio signal output from the audio output device, wherein in response to the simultaneous sound output mode, the audio format of the sound output device corresponding to a second audio format information among the plurality of audio format information, and a second audio processing time corresponding to the second audio format in the sound output device being greater than the first audio processing time corresponding to the first audio format in the sound output device, the signal processing device is configured to control the second additional delay time corresponding to the second audio format in the sound output device to be less than the second additional delay time corresponding to the first audio format in the sound output device.

2. The image display apparatus of claim 1, wherein the interface is configured to receive the plurality of audio format information and a plurality of audio processing time information corresponding to the plurality of audio format information from the sound output device, wherein in the simultaneous sound output mode, the signal processing device is configured to calculate the first additional delay time of the first audio signal based on the plurality of audio format information and the plurality of audio processing time information.

3. The image display apparatus of claim 1, wherein in the simultaneous sound output mode, the signal processing device is configured to calculate the first additional delay time of the first audio signal based on video processing time information of an input video signal, the audio format information, and the audio processing time information of the sound output device corresponding to the audio format information.

4. The image display apparatus of claim 3, wherein in the simultaneous sound output mode, the signal processing device is configured to calculate the first additional delay time of the first audio signal based on the video processing time information of the input video signal, output time information for the sound output device, the audio format information, and the audio processing time information of the sound output device corresponding to the audio format information.

5. The image display apparatus of claim 4, wherein as a level of the output time information for the sound output device increases, or a level of audio processing time information of an audio driver decreases, or a level of the audio processing time information of the sound output device increases, the signal processing device is configured to increase the first additional delay time of the first audio signal.

6. The image display apparatus of claim 1, wherein after the sound output device is turned on, the interface is configured to receive the plurality of audio format information through a first transmission line, wherein in the simultaneous sound output mode, the interface is configured to transmit the second audio signal to the sound output device through a second transmission line.

7. The image display apparatus of claim 1, wherein in case in which the sound output device is turned off during operation in the simultaneous sound output mode, the signal processing device is configured to switch to the single sound output mode in which the audio output device solely outputs sound.

8. The image display apparatus of claim 1, wherein while a broadcast video is displayed on the display, the signal processing device is configured to control the first additional delay time based on the first audio signal output from the audio output device to be greater than or equal to the third additional delay time based on the third audio signal output from the audio output device.

9. The image display apparatus of claim 1, wherein the signal processing device is configured to control the first additional delay time based on the first audio signal output from the audio output device while a cinema video is displayed on the display, to be greater than the first additional delay time based on the first audio signal which is output from the audio output device while a broadcast video is displayed on the display.

10. An image display apparatus comprising:

a display;

an audio output device configured to output sound;

an interface configured to receive a plurality of audio format information of an external sound output device from the sound output device after the sound output device is turned on; and a signal processing device configured to:

receive the plurality of audio format information through the interface, in response to a simultaneous sound output mode of the sound output device and the audio output device, and an audio format of the sound output device corresponding to a first audio format information among the plurality of audio format information, calculate a first additional delay time based on the first audio format information, output a first audio signal based on the calculated first additional delay time to the audio output device, and output a second audio signal based on a second additional delay time, which is lower in level than the first additional delay time, to the sound output device, wherein in response to the simultaneous sound output mode, the audio format of the sound output device corresponding to a second audio format information among the plurality of audio format information, and a second audio processing time corresponding to the second audio format in the sound output device being greater than the first audio processing time corresponding to the first audio format in the sound output device, the signal processing device is configured to control the second additional delay time corresponding to the second audio format in the sound output device to be less than the second additional delay time corresponding to the first audio format in the sound output device.

11. The image display apparatus of claim 10, wherein the interface is configured to receive the plurality of audio format information and a plurality of audio processing time information corresponding to the plurality of audio format information from the sound output device, wherein in the simultaneous sound output mode, the signal processing device is configured to calculate the first additional delay time of the first audio signal based on the audio format information or the audio processing time information.

12. The image display apparatus of claim 10, wherein in the simultaneous sound output mode, the signal processing device is configured to calculate the first additional delay time of the first audio signal based on video processing time information of an input video signal, the plurality of audio format information, and the audio processing time information of the sound output device corresponding to the plurality of audio format information.

13. The image display apparatus of claim 12, wherein in the simultaneous sound output mode, the signal processing device is configured to calculate the first additional delay time of the first audio signal based on the video processing time information of the input video signal, output time information for the sound output device, the audio format information, and the audio processing time information of the sound output device corresponding to the audio format information.

14. The image display apparatus of claim 13, wherein as a level of the output time information for the sound output device increases, or a level of audio processing time information of an audio driver decreases, or a level of the audio processing time information of the sound output device increases, the signal processing device is configured to increase the first additional delay time of the first audio signal.

15. An image display apparatus comprising:

a display;

an audio output device configured to output sound;

an interface configured to receive a plurality of audio format information of an external sound output device from the sound output device after the sound output device is turned on; and a signal processing device configured to:

receive the plurality of audio format information through the interface, in response to a simultaneous sound output mode of the sound output device and the audio output device, and an audio format of the sound output device corresponding to a first audio format information among the plurality of audio format information, calculate a first additional delay time based on a first audio processing time information of the sound output device corresponding to the first audio format information, output a first audio signal based on the first additional delay time to the audio output device and output a second audio signal based on a second additional delay time, which is lower in level than the first additional delay time, to the sound output device, wherein the interface is configured to:

after the sound output device is turned on, receive the plurality of audio format information through a first transmission line; and in the simultaneous sound output mode, transmit the second audio signal to the sound output device through a second transmission line, wherein in response to the simultaneous sound output mode, the audio format of the sound output device corresponding to a second audio format information among the plurality of audio format information, and a second audio processing time corresponding to the second audio format in the sound output device being greater than the first audio processing time corresponding to the first audio format in the sound output device, the signal processing device is configured to control the second additional delay time corresponding to the second audio format in the sound output device to be less than the second additional delay time corresponding to the first audio format in the sound output device.

16. The image display apparatus of claim 15, wherein the interface is configured to receive the audio format information or the audio processing time information from the sound output device, wherein in the simultaneous sound output mode, the signal processing device is configured to calculate the first additional delay time of the first audio signal based on the plurality of audio format information and a plurality of audio processing time information corresponding to the plurality of audio format information.

17. The image display apparatus of claim 15, wherein in the simultaneous sound output mode, the signal processing device is configured to calculate the first additional delay time of the first audio signal based on video processing time information of an input video signal, the audio format information, and the audio processing time information of the sound output device corresponding to the audio format information.

18. The image display apparatus of claim 17, wherein in the simultaneous sound output mode, the signal processing device is configured to calculate the first additional delay time of the first audio signal based on the video processing time information of the input video signal, output time information for the sound output device, the audio format information, and the audio processing time information of the sound output device corresponding to the audio format information.

* * * * *